(12) United States Patent
Pinkowski et al.

(10) Patent No.: US 12,548,988 B2
(45) Date of Patent: Feb. 10, 2026

(54) INTERCHANGEABLE MODULAR OUTLET COVER

(71) Applicant: Trevor Pinkowski, Muskego, WI (US)

(72) Inventors: Trevor Pinkowski, Muskego, WI (US); Marvin Pinkowski, Friendship, WI (US); Michael Sekula, Muskego, WI (US); David Gebhardt, Muskego, WI (US)

(73) Assignee: Tremar Corporation, Muskego, WI (US)

( * ) Notice: Subject to any disclaimer, the term of this patent is extended or adjusted under 35 U.S.C. 154(b) by 336 days.

(21) Appl. No.: 17/962,631

(22) Filed: Oct. 10, 2022

(65) Prior Publication Data

US 2023/0034501 A1    Feb. 2, 2023

Related U.S. Application Data

(63) Continuation-in-part of application No. 29/810,853, filed on Oct. 8, 2021, now Pat. No. Des. 1,024,733, and a continuation-in-part of application No. 29/769,875, filed on Feb. 8, 2021, now Pat. No. Des. 1,015,121.

(60) Provisional application No. 63/253,894, filed on Oct. 8, 2021.

(51) Int. Cl.
*H02G 3/14*    (2006.01)
*H02G 3/18*    (2006.01)

(52) U.S. Cl.
CPC ............... *H02G 3/14* (2013.01); *H02G 3/18* (2013.01)

(58) Field of Classification Search
None
See application file for complete search history.

(56) References Cited

U.S. PATENT DOCUMENTS

| 629,445 | A | * | 7/1899 | Hunt | ............... H01R 13/447 |
| | | | | | 174/67 |
| 2,934,590 | A | | 4/1960 | Thompson et al. | |
| 2,980,283 | A | * | 4/1961 | Bentsen | ............... H02G 3/14 |
| | | | | | 220/241 |
| 3,168,612 | A | | 2/1965 | Sorenson | |
| 3,185,760 | A | | 5/1965 | Despard | |

(Continued)

FOREIGN PATENT DOCUMENTS

GB    2134330 A * 8/1984 ............. H02G 3/105

*Primary Examiner* — Krystal Robinson
(74) *Attorney, Agent, or Firm* — Boyle Fredrickson, S.C.

(57) ABSTRACT

A modular cover plate assembly for mounting an electrical circuit device to an electrical outlet box includes at least one electrical circuit device, a cover plate having at least one opening formed therein, and multiple adapters configured for insertion into the at least one opening. For instance the cover plate has one or two openings formed therein of rectangular or circular shape. The adapters can be inserted into the opening so that the cover plate may be used with a variety of different styles of outlet inserts. For instance, the adapters may include an electrical outlet adapter, a switch adapter, and/or a rocker switch adapter. The modular cover plate assembly can have other features to optimize functionality, including corner fastener channels configured to receive and hold screws in place prior to installation, and an adapter cover that allows the assembly to be converted to a 4¹¹⁄₁₆ inch cover plate.

20 Claims, 41 Drawing Sheets

(56) References Cited

U.S. PATENT DOCUMENTS

| | | | |
|---|---|---|---|
| 3,662,085 | A | 5/1972 | Robinson et al. |
| 3,953,933 | A * | 5/1976 | Goldstein ................ H02G 3/14 |
| | | | 40/792 |
| 4,500,746 | A | 2/1985 | Meehan |
| 4,850,901 | A * | 7/1989 | Smith .................... G02B 6/477 |
| | | | 439/501 |
| 4,874,904 | A * | 10/1989 | DeSanti ................ G02B 6/477 |
| | | | D13/152 |
| 4,875,880 | A * | 10/1989 | Welch .................. H01R 13/514 |
| | | | 439/536 |
| 5,170,013 | A | 12/1992 | Borsh et al. |
| 5,189,256 | A * | 2/1993 | Epple .................... G02B 6/477 |
| | | | 174/53 |
| 5,223,673 | A | 6/1993 | Mason |
| 5,477,010 | A | 12/1995 | Buckshaw et al. |
| 5,594,205 | A | 1/1997 | Cancellieri et al. |
| 5,651,696 | A * | 7/1997 | Jennison ................ H02G 3/18 |
| | | | 174/66 |
| 5,873,553 | A | 2/1999 | Stahl et al. |
| 6,172,301 | B1 | 1/2001 | Goodsell |
| 6,242,698 | B1 | 6/2001 | Baker, III et al. |
| 6,398,594 | B1 | 6/2002 | Bonilla et al. |
| 6,441,304 | B1 | 8/2002 | Currier et al. |
| 6,552,269 | B1 | 4/2003 | Conner |
| 6,563,051 | B1 | 5/2003 | Shotey et al. |
| 6,616,005 | B1 * | 9/2003 | Pereira .................... H02G 3/14 |
| | | | 220/241 |
| 7,052,221 | B2 | 5/2006 | Bentrim |
| 7,056,145 | B2 | 6/2006 | Campbell, III et al. |
| 7,071,414 | B2 * | 7/2006 | Kim ........................ H02G 3/14 |
| | | | 174/67 |
| 7,323,639 | B1 | 1/2008 | Shotey et al. |
| 7,425,681 | B2 * | 9/2008 | Xu .......................... H02G 3/14 |
| | | | 174/67 |
| 7,799,992 | B2 | 9/2010 | Pinkowski |
| 9,711,957 | B2 * | 7/2017 | Trojanowski ............ H02G 3/14 |
| 2009/0107693 | A1 * | 4/2009 | Meyer .................... H02G 3/123 |
| | | | 174/60 |
| 2019/0348829 | A1 * | 11/2019 | Davis ...................... H01H 9/08 |
| 2021/0281057 | A1 * | 9/2021 | Neill ........................ H02G 3/14 |

* cited by examiner

INTERCHANGEABLE MODULAR OUTLET COVER

CROSS-REFERENCE TO RELATED APPLICATION

This application claims priority to U.S. Provisional Patent Application No. 63/253,894 filed on Oct. 8, 2021, U.S. patent application Ser. No. 29/810,853 filed on Oct. 8, 2021, and to U.S. patent application Ser. No. 29/769,875, filed Feb. 8, 2021, the entire contents of which are hereby expressly incorporated by reference into the present application.

BACKGROUND OF THE INVENTION

1. Field of the Invention

This invention is related generally to cover plate assemblies for electrical outlet boxes and, more particularly, modular cover plate assemblies for surface mounted electrical outlet boxes. Even more specifically, the present invention is directed to modular cover plate assemblies including raised boxes have one or more openings formed therein, where various adapters may be configured to quickly and easily be installed about the opening. For instance, the present invention is directed to a raised box having one or two rectangular openings, where the openings are configured to receive an electrical outlet adapter, a switch adapter, and/or a rocker switch adapter.

2. Discussion of the Related Art

Prevailing building and safety codes such as the National Electrical Code of the National Fire Protection Association, which has been adopted by many states and municipalities, require that electrical wiring connections to electrical circuit devices from an electrical circuit or electrical conduit occur in an enclosed electrical outlet or junction box housing.

Electrical outlet boxes are available in a variety of styles and shapes, but each has a concave interior cavity with a substantially planar opening. Cover plates (also called face plates) for these boxes have openings of various standard sizes and shapes to accommodate the exterior interface portions of the electrical circuit devices. When the electrical circuit device is securely attached to the cover plate, the exterior interface portion of the electrical circuit device extends through these openings in the cover plate to create an uninterrupted cover plate assembly. This assembly may then be attached to the outlet box to serve as an exterior front wall and thereby create an enclosed housing.

Typically, electrical outlet boxes are manufactured in a specific configuration, such as separate electrical outlet boxes for electrical outlets, separate electrical outlet boxes for switches, separate electrical outlet boxes for rocker switches, and any other desired electrical box configurations. This requires manufacturers to manufacture a number of different electrical outlet boxes, and sellers to stock each of these types of electrical outlet boxes. This requires additional manufacturing efforts to manufacture each of the desired electrical outlet boxes. This also requires significantly greater storage space for each type of electrical outlet box.

Many of the downsides of existing electrical outlet boxes and associated components were improved by the Cover Plate for Surface Mount Junction Box with Locking Member described in U.S. Pat. No. 7,799,992, the entirety of which is incorporated herein by reference. Nevertheless further improvements are desired.

For instance, improved cover plate assemblies are desired that are modular in nature, and therefore equipped for more universal use across multiple applications. What is further desired is a modular cover plate assembly having one or more openings formed therein, where the openings are configured to receive any number of adapters that enable the cover plate assembly to function in a desired way. These and other advantages of the present invention will be better understood based on the additional disclosure provided below.

SUMMARY OF THE INVENTION

According to an aspect of the present invention, a modular cover plate assembly is provided that allows an electrical circuit device to be mounted to an electrical outlet box. The modular cover plate assembly advantageously allows for quick and easy customization based on the specific electrical circuit devices needed for a given location.

The assembly includes a modular cover plate, at least one opening formed in the modular cover plate, and an outlet insert adapter that is insertable into the at least one opening. A variety of different outlet insert adapters may be provided, with each configured to receive a different standard electrical circuit device. The at least one opening is a first substantially rectangular opening configured to receive one outlet insert adapter in one embodiment. The at least one opening is a first substantially rectangular opening configured to receive a first outlet insert adapter and a second substantially rectangular opening configured to receive a second outlet insert adapter in another embodiment. In yet another embodiment, the at least one opening is a substantially circular opening.

According to another aspect of the present invention, the modular cover plate also may include a ridge that extends around the at least one opening. Additionally, the outlet insert adapter may have a body and a lip that is extending form the body. In such an embodiment, the ridge and the lip enable receipt of the outlet insert adapter into the at least one opening formed in the modular over plate quickly and easily without use of tools or other components. For instance, the outlet insert adapter is secured to the modular cover plate by a friction fit, but a snap fit, or by any other fit or fastener.

According to yet another aspect of the present invention, the at least opening is also formed into the outlet insert adapter. For instance, where the outlet insert adapter is an electrical outlet adapter, two openings may be formed therein: a first opening that is a first socket-aperture and a second opening that is a second socket-aperture that is vertically offset or spaced from the first opening. Where the outlet insert adapter is a switch adapter, one opening is provided that is substantially rectangular in shape and configured to receive a switch. Where the outlet insert adapter is a rocker switch adapter, one opening is provided that is substantially rectangular in shape and configured to receive a rocker switch.

According to another aspect of the present invention, at least two corner fastener channels are provided. These corner fastener channels are configured to hold a fastener when the modular cover plate assembly is installed. Additionally, the at least two corner fastener channels may all be spaced from the sidewalls of the modular cover plate by a gap.

According to yet another aspect of the present invention, a modular cover plate assembly is provided for mounting an electrical circuit device to an electrical outlet box. The assembly includes a cover plate, at least one interchangeable insert, and at least one electrical circuit device. The cover plate includes a body having a front surface, a rear surface, and at least one opening extending from the front surface to the rear surface. The at least one interchangeable insert may be positioned within the at least one opening, with the at least one interchangeable insert being sized and shaped to accommodate standard common electrical circuit devices, such as electrical outlets, switches, rocker switches, and associated holders, mounts, and components. For instance, the electrical outlet adapter may have first and second socket-apertures, the switch adapter may have a single rectangular aperture, and the rocker switch may have a single rectangular aperture. The at least one electrical circuit device may be mounted to the cover plate and the at least one interchangeable insert.

According to another aspect of the present invention, the at least one interchangeable insert may have a front surface, and the at least one electrical circuit device may have a front surface. When assembled, the cover plate front surface, the at least one interchangeable insert front surface, and the at least one electrical circuit device front surface are coplanar.

According to yet another aspect of the present invention, the at least one interchangeable insert may include a body and a lip extending from the body. Additionally, the cover plate may further include a ridge that extends inwardly towards the at least one opening. The lip and the ridge may overlap one another when the cover plate and the at least one interchangeable insert are assembled.

Further still, according to another aspect of the present invention, a method of assembling a modular cover plate assembly is provided. The method includes the steps of selecting a cover plate having at least one opening formed therein, selecting at least one adapter from a plurality of adapters configured for common electrical circuit devices, inserting the at least one adapter into the at least one opening, and securing at least one electrical circuit device to the cover plate and the at least one interchangeable insert. The method may also include the steps of overlapping a lip extending from a body of the at least one adapter with a ridge extending from the over plate towards the opening and holding the at least one adapter in the opening by one or more of a friction fit and a snap fit. The method may further include the step of providing a kit containing at least one cover plate, a plurality of adapters, and at least one electrical circuit devices, and associated fasteners for installation.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the figures, drawings and photographs accompanying and forming a part of this specification.

Figure 1:
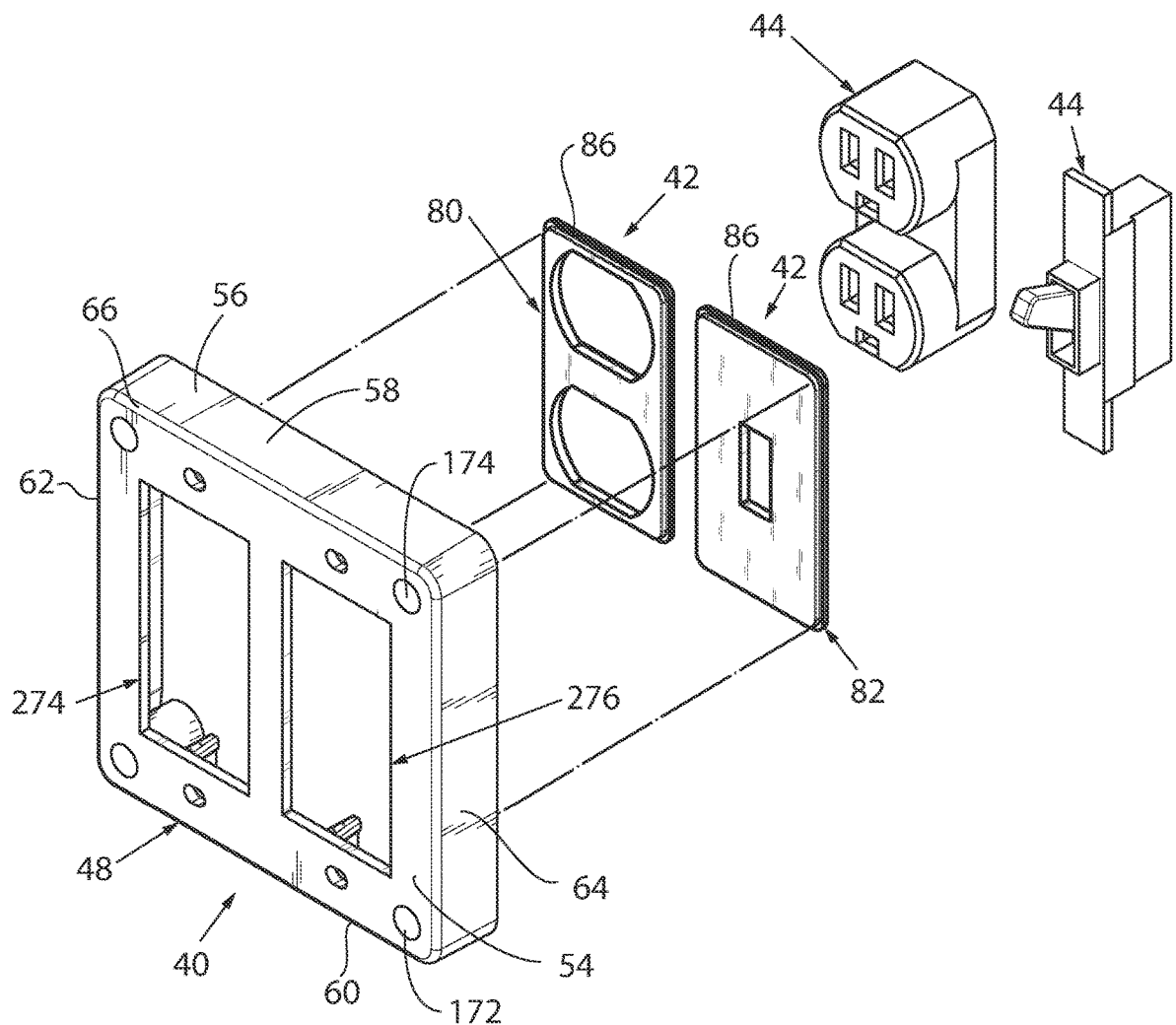
FIG. 1 is an exploded isometric perspective view of an inventive modular electrical box cover plate configured for two adapters associated with electrical circuit devices.
Figure 2:
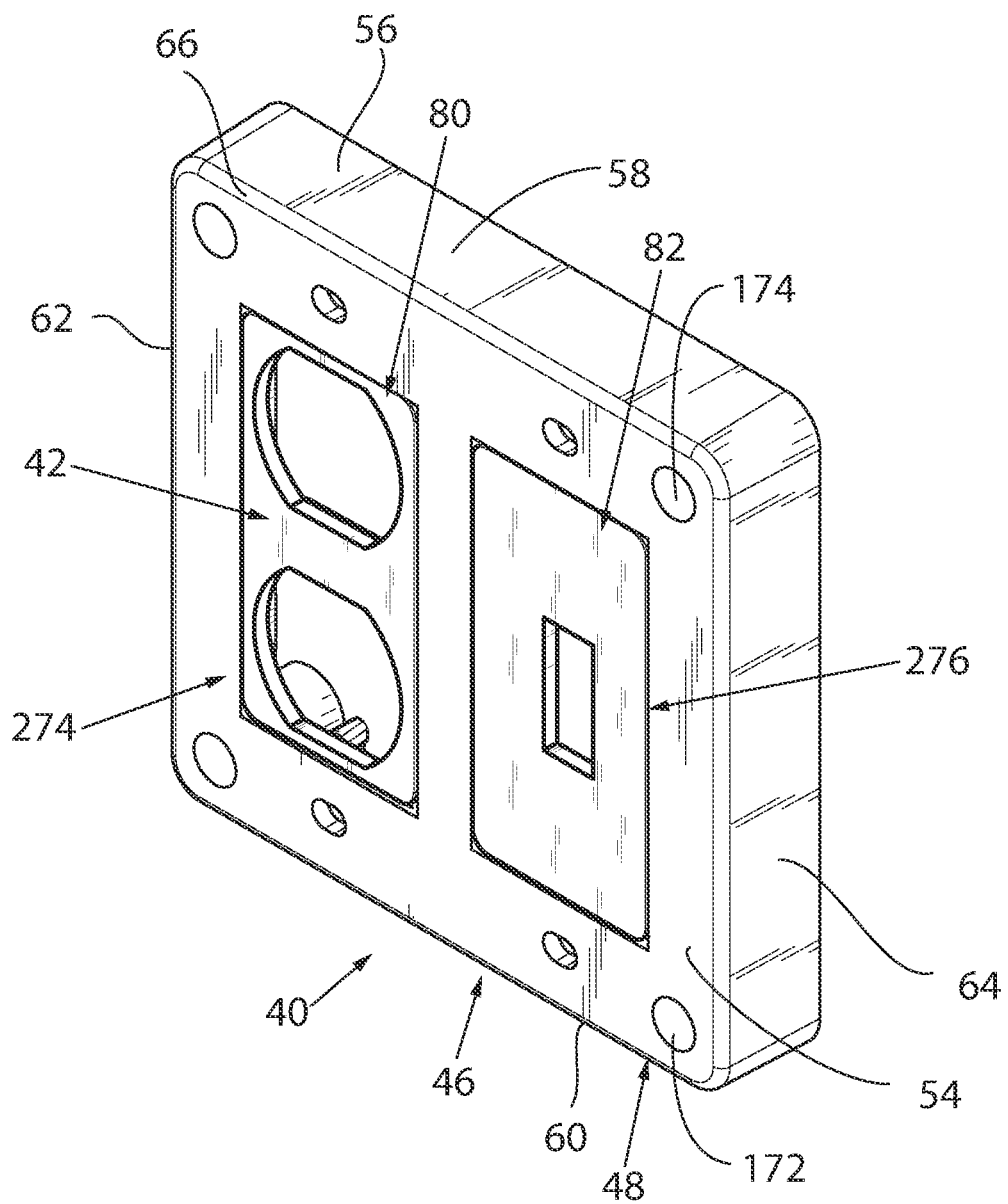
FIG. 2 is an assembled isometric perspective view of the inventive modular electrical box cover plate of FIG. 1.
Figure 3:
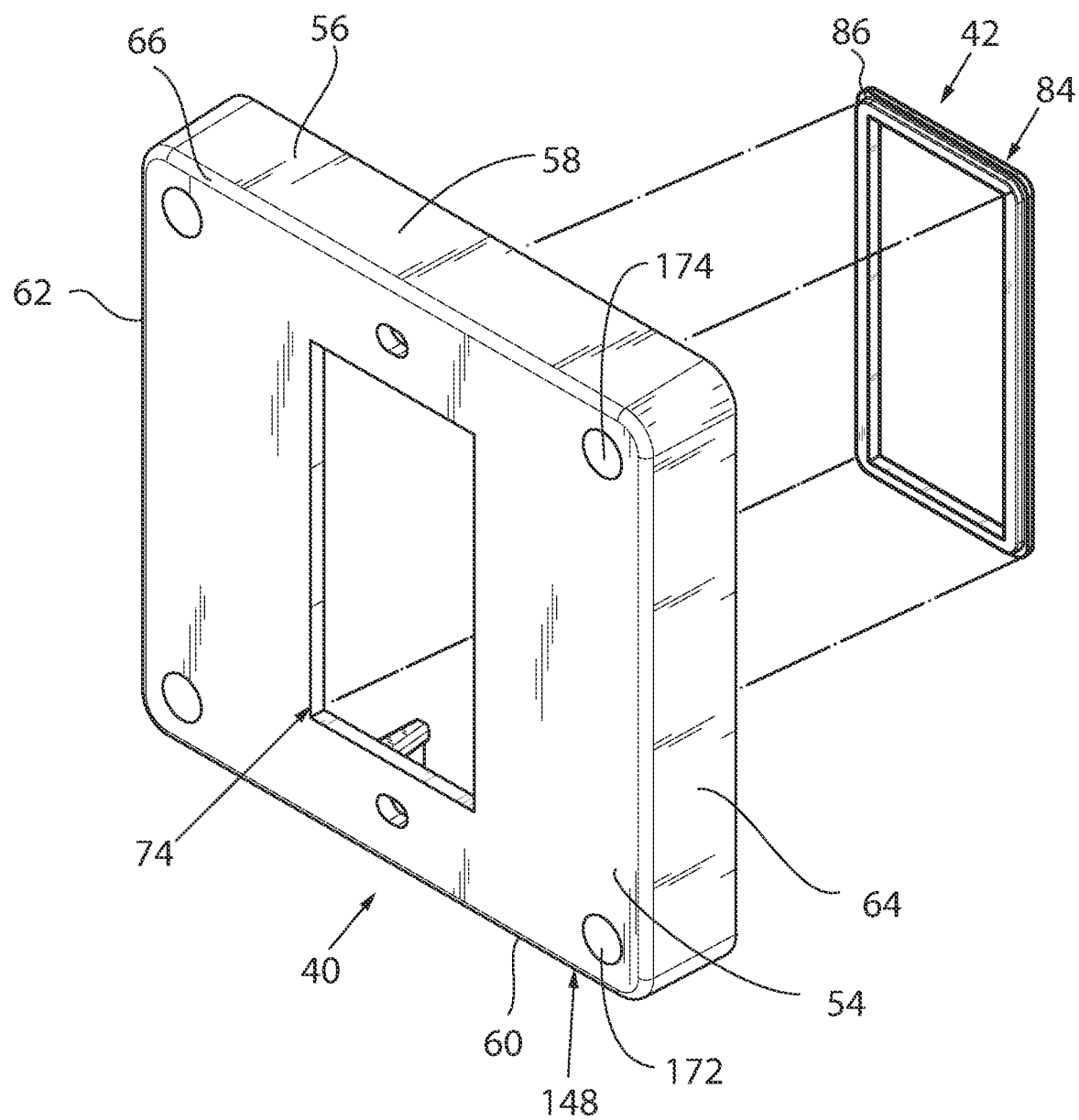
FIG. 3 is an exploded isometric perspective view of the inventive modular electrical box cover plate configured for one adapter associated with an electrical circuit devices.
Figure 4:
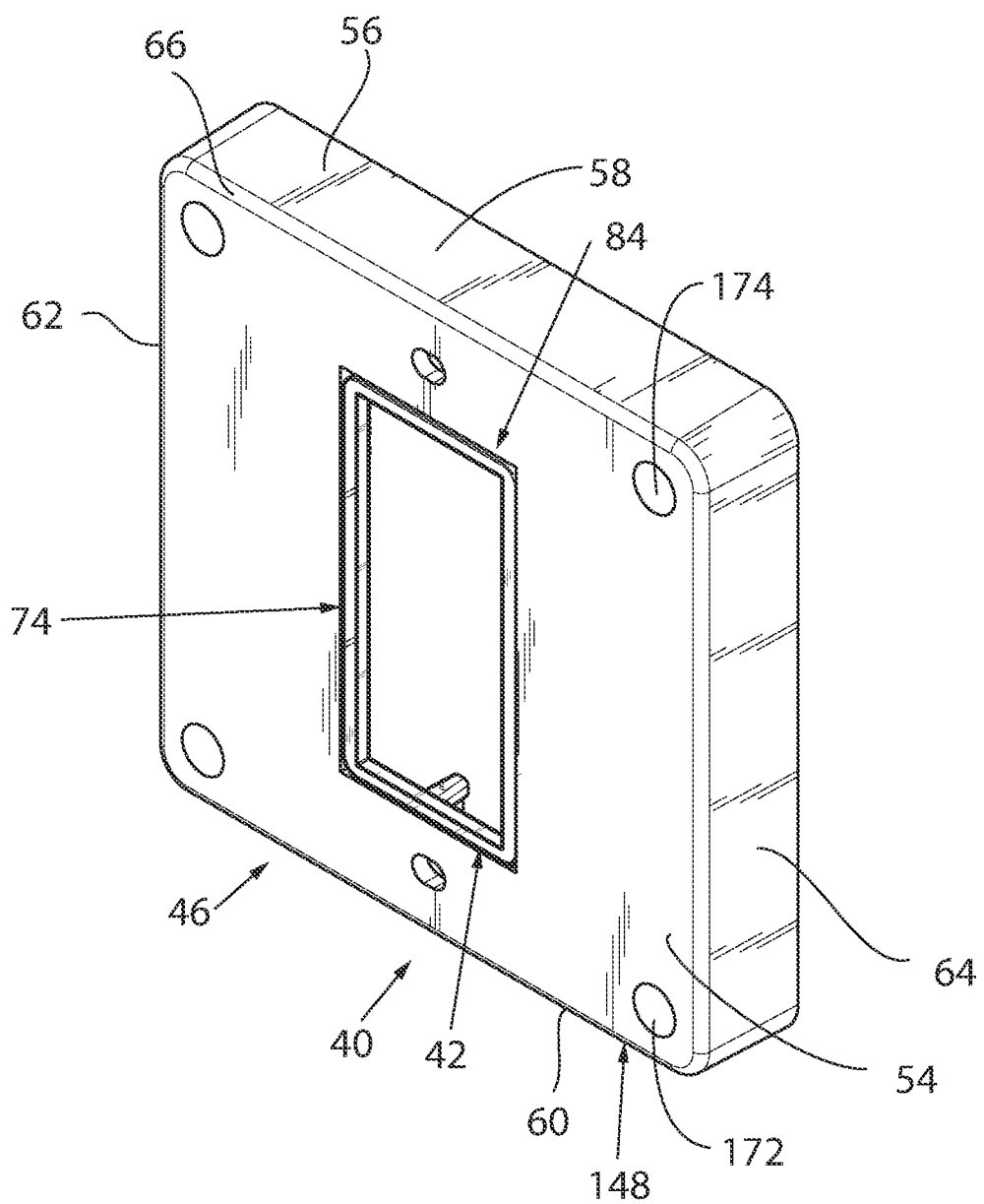
FIG. 4 is an assembled isometric perspective view of the inventive modular electrical box cover plate of FIG. 3.
Figure 5:
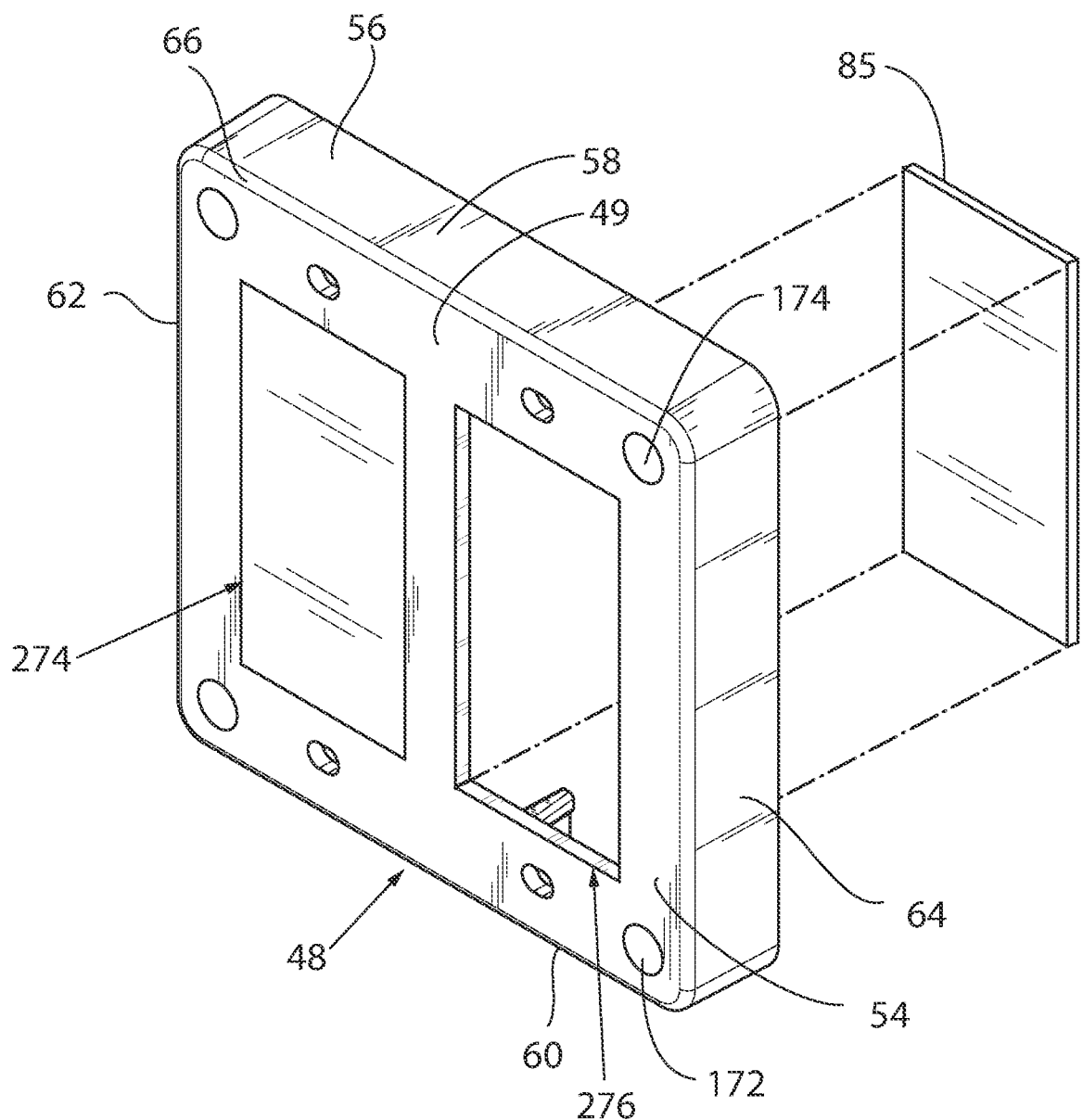
FIG. 5 is an isometric perspective view of the inventive modular electrical box cover plate of FIG. 1.
Figure 6:
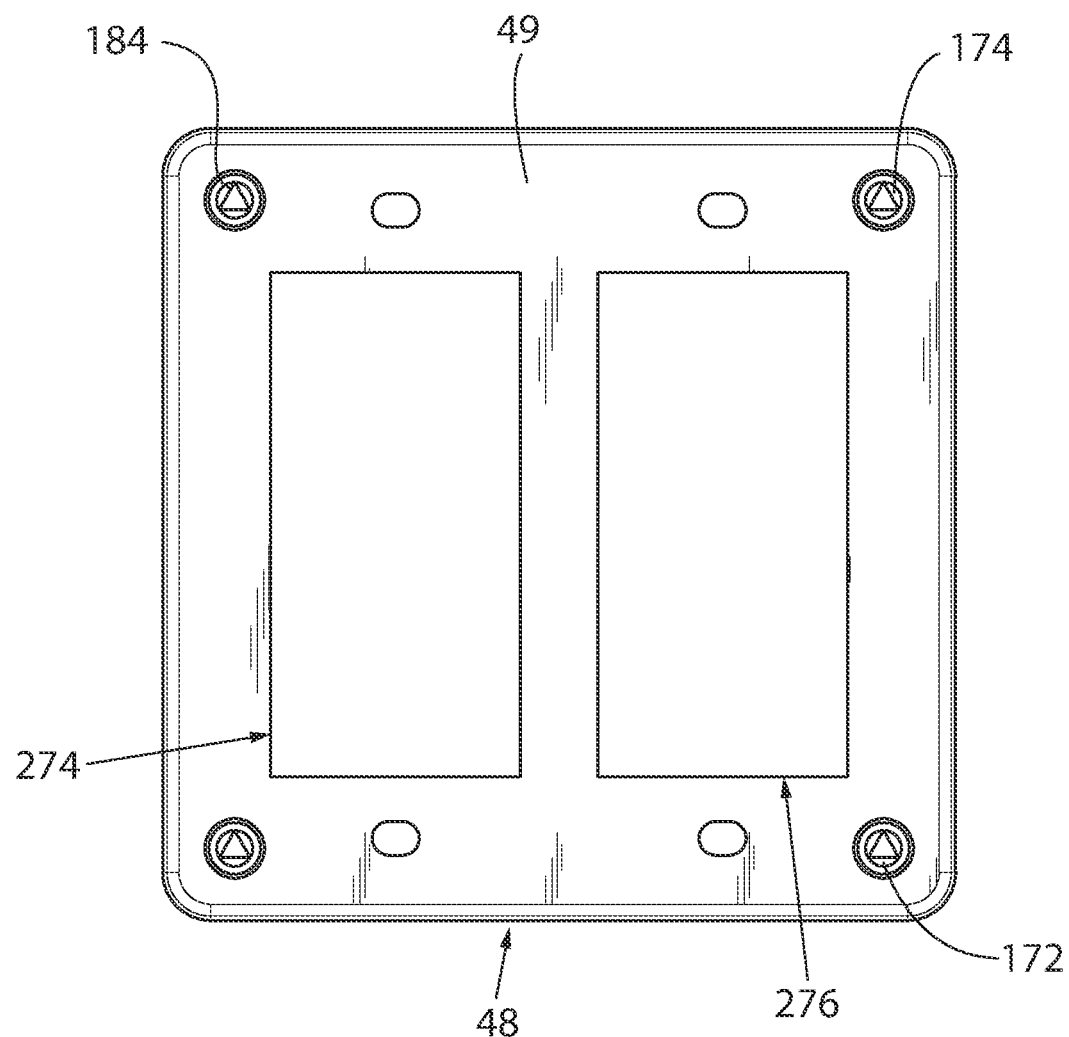
FIG. 6 is a front elevation view of the inventive modular electrical box cover plate of FIG. 5.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words connected, attached, or terms similar thereto are often used. They are not limited to direct connection but include connection through other elements where such connection is recognized as being equivalent by those skilled in the art.

DETAILED DESCRIPTION OF PREFERRED EMBODIMENTS

Turning broadly to the figures, preferred embodiments of an improved modular electrical box cover plate 40 and one or more adapters 42 are shown to which conventional electrical circuit devices 44 can be attached to form a cover plate assembly 46 in accordance with the present invention. Identical reference numbers refer to similar features throughout this description. The modular electrical box cover plate 40, associated interchangeable adapters 42, and electrical circuit devices 44 are quickly and easily assembled together without the need for the application of any adhesive such as glue or the use of any fasteners such as threaded screws and nuts to hold them together.

A number of embodiments of the cover plate assembly 46 is shown in the figures. In the present invention, a cover plate 48 has a body 49 with a rectangular planar front wall 54 and a side wall 56 comprised of four planar side sections 58, 60, 62, 64. The side wall 56 extends orthogonally rearward along the perimeter or cover-outer edge 66 of the front wall 54. The front wall 54 is substantially square in shape and in the illustrated embodiment has dimensions standard in the industry, for instance preferably about 4.0625 in. by 4.0625 in., although the front wall 54 and associated cover plate 48 may have other dimensions as may be desired. The side sections 58, 60, 62, 64 of the illustrated embodiment each have preferably a width of about 0.6875 in. and a thickness of about 0.08 in., although again the dimensions may be varied as desired.

The rear surface 68 of the cover plate 48 includes the back face (also known as rear side) 70 of the front wall 54 and the interior surface 72 of each side section 58, 60, 62, 64 adjacent to back face 70. The top section 58 of the side wall 56 is positioned at the upper end of the cover plate 48. The bottom section 60, on the other hand, is opposite to top section 58 at the lower end of cover plate 48. As used throughout this application, the terms "upper", "lower", "top" and "bottom" provide relative positioning along a suggested vertical dimension with respect to a horizontal plane. These terms are used herein for ease in discussing certain embodiments of the present invention depicted in the drawings. In particular, the cover plate 48 is depicted in the figures with an orientation where the side sections 62, 64 are substantially vertical to the plane of the ground and top and bottom sections 58, 60 are substantially horizontal to the ground. One skilled in the art will readily recognize, however, that the cover plates and cover plate assemblies illustrated and described herein can be used in any orientation.

Figure 7:
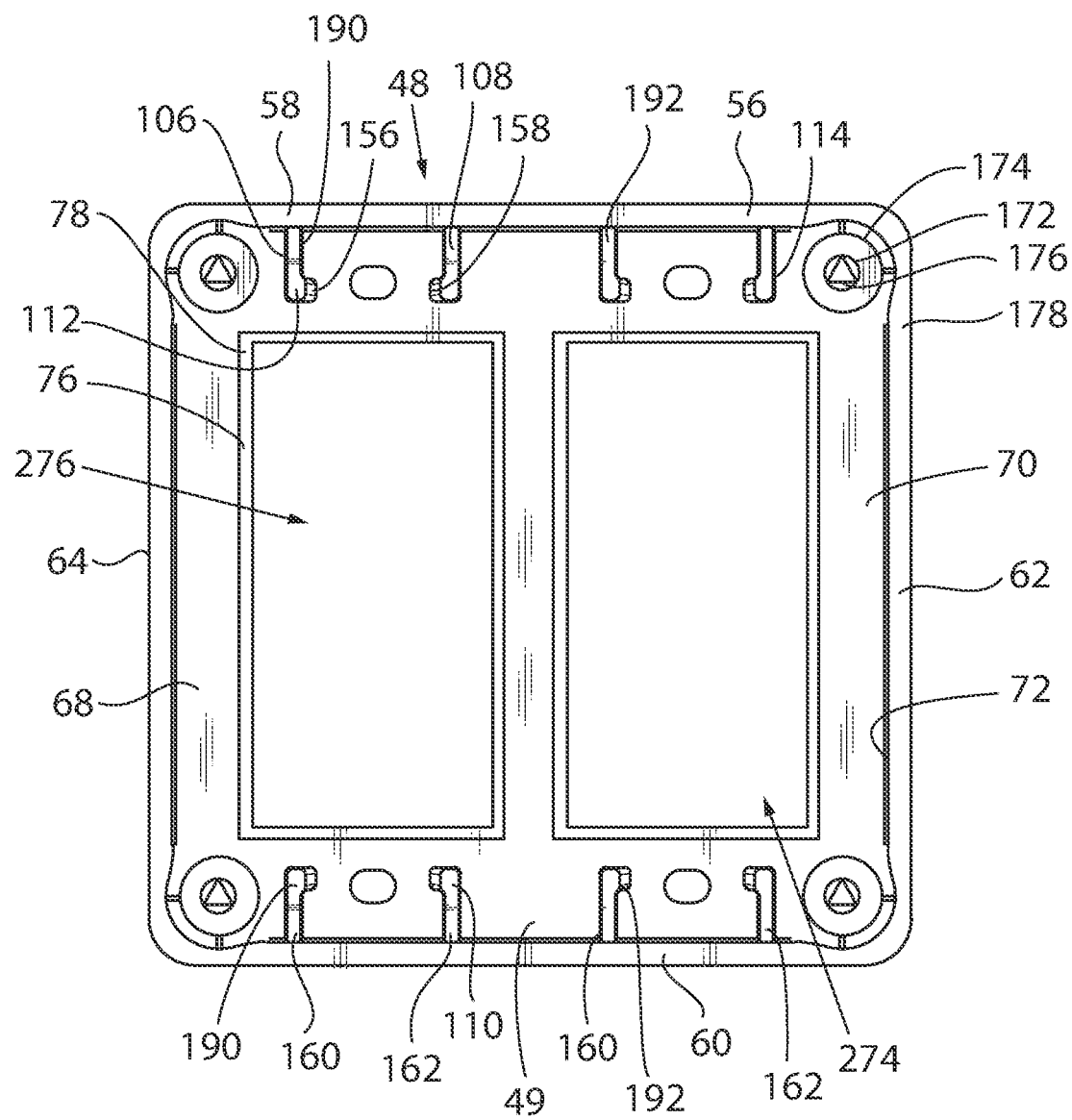
FIG. 7 is a rear elevation view of the inventive modular electrical box cover plate of FIGS. 5 and 6.
Figure 8:
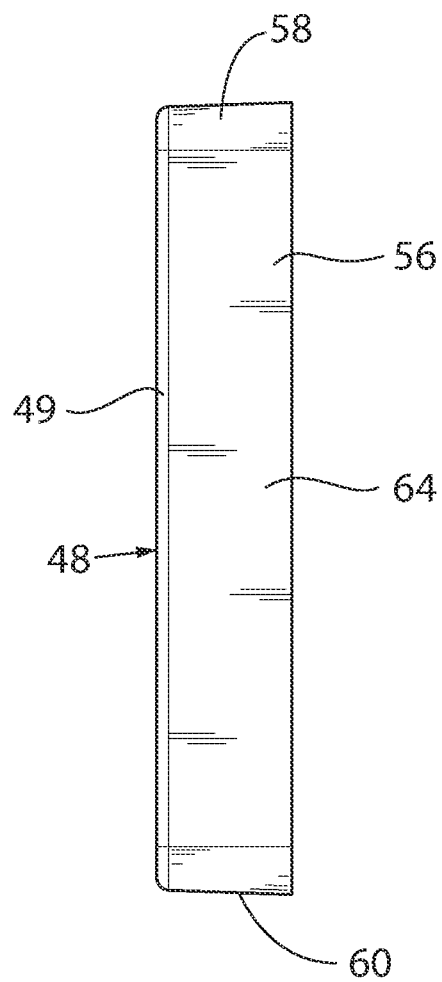
FIG. 8 is a side elevation view of the inventive modular electrical box cover plate of FIGS. 5-7.
Figure 9:
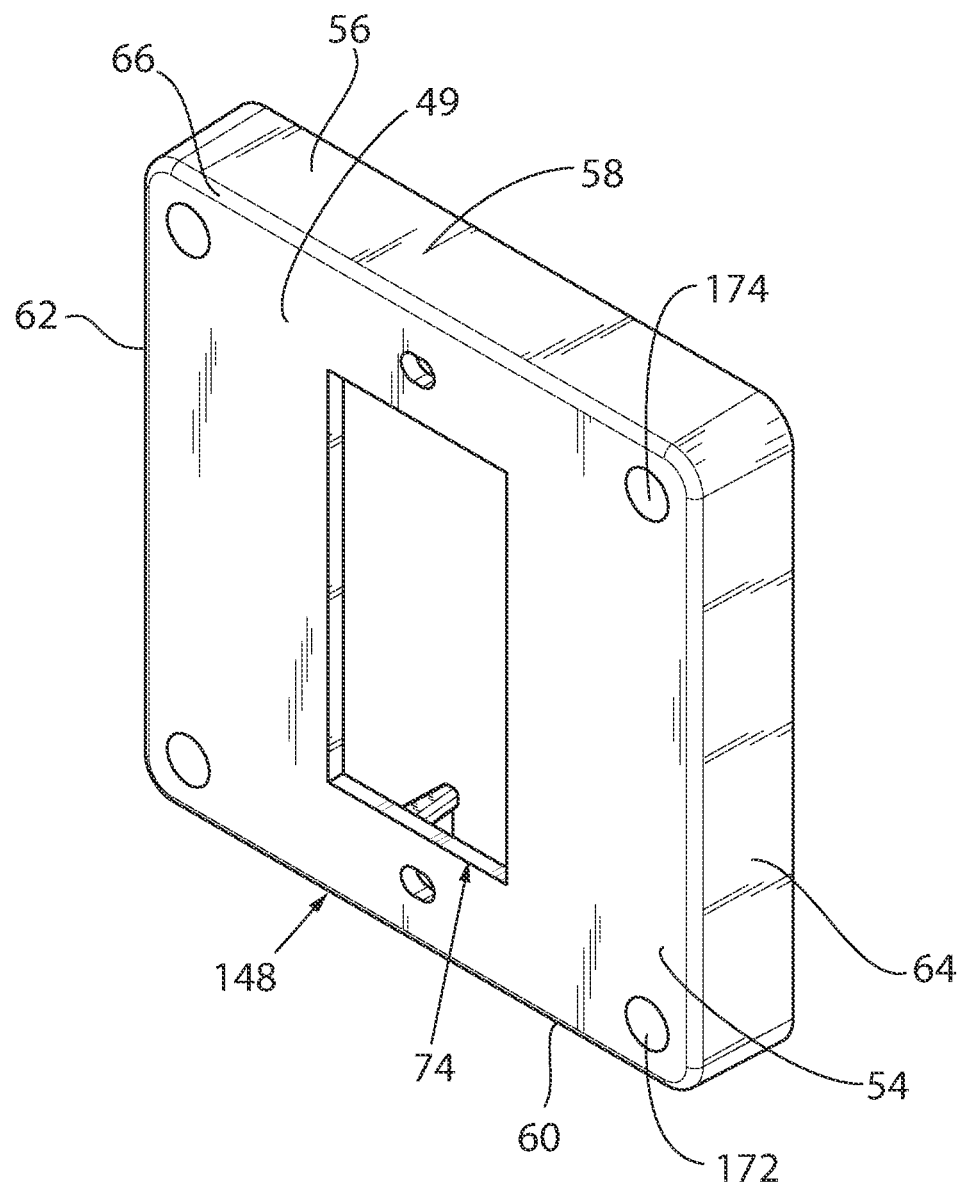
FIG. 9 is an isometric perspective view of the inventive modular electrical box cover plate of FIG. 3.
Figure 10:
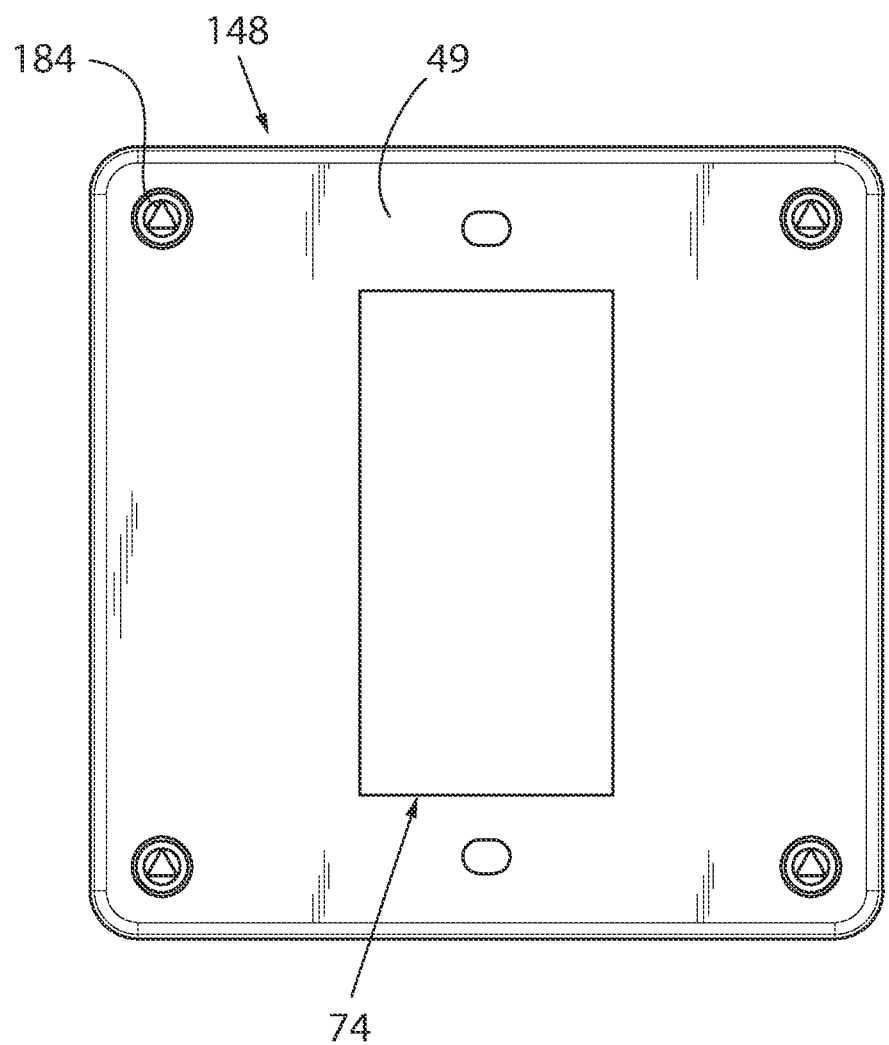
FIG. 10 is a front elevation view of the inventive modular electrical box cover plate of FIG. 9.
Figure 11:
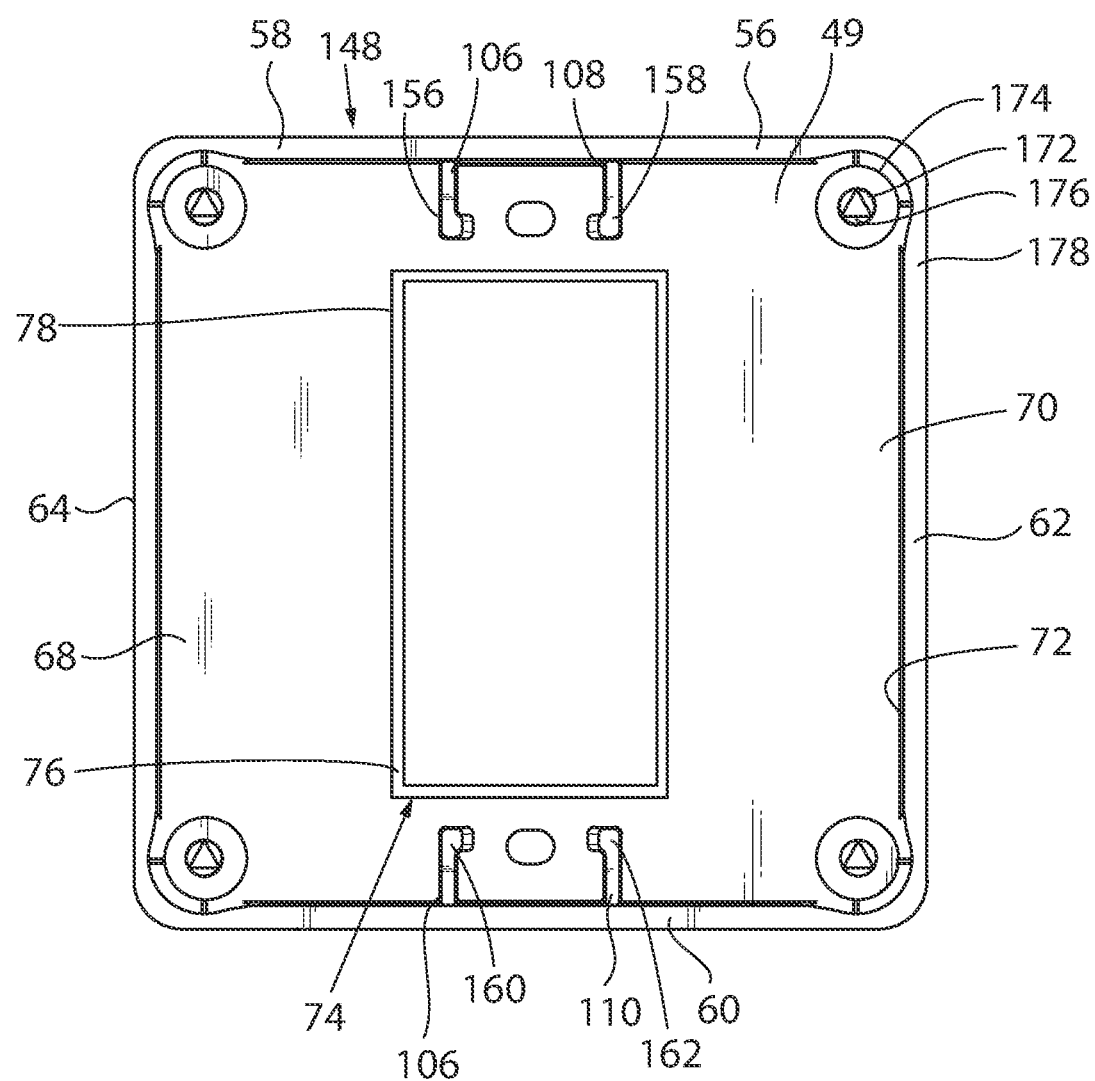
FIG. 11 is a rear elevation view of the inventive modular electrical box cover plate of FIGS. 9 and 10.
Figure 12:
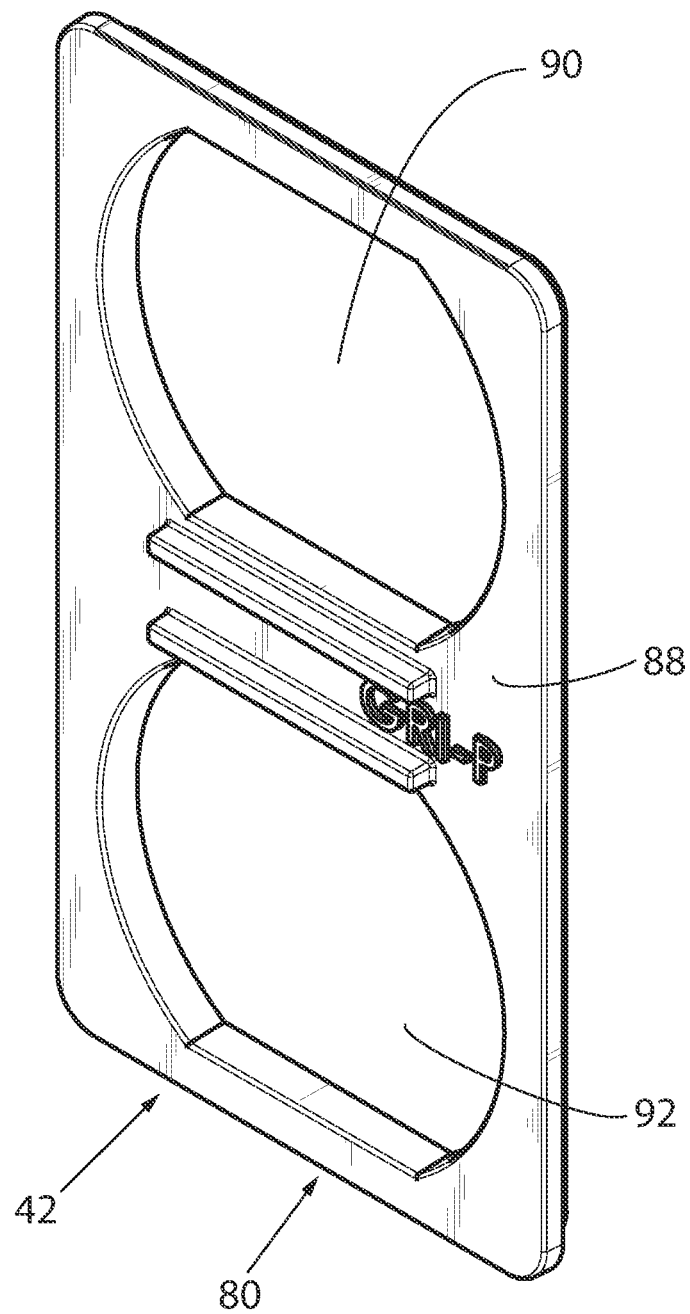
FIG. 12 is an isometric perspective view of a first adapter that is an electrical outlet adapter.
Figure 13:
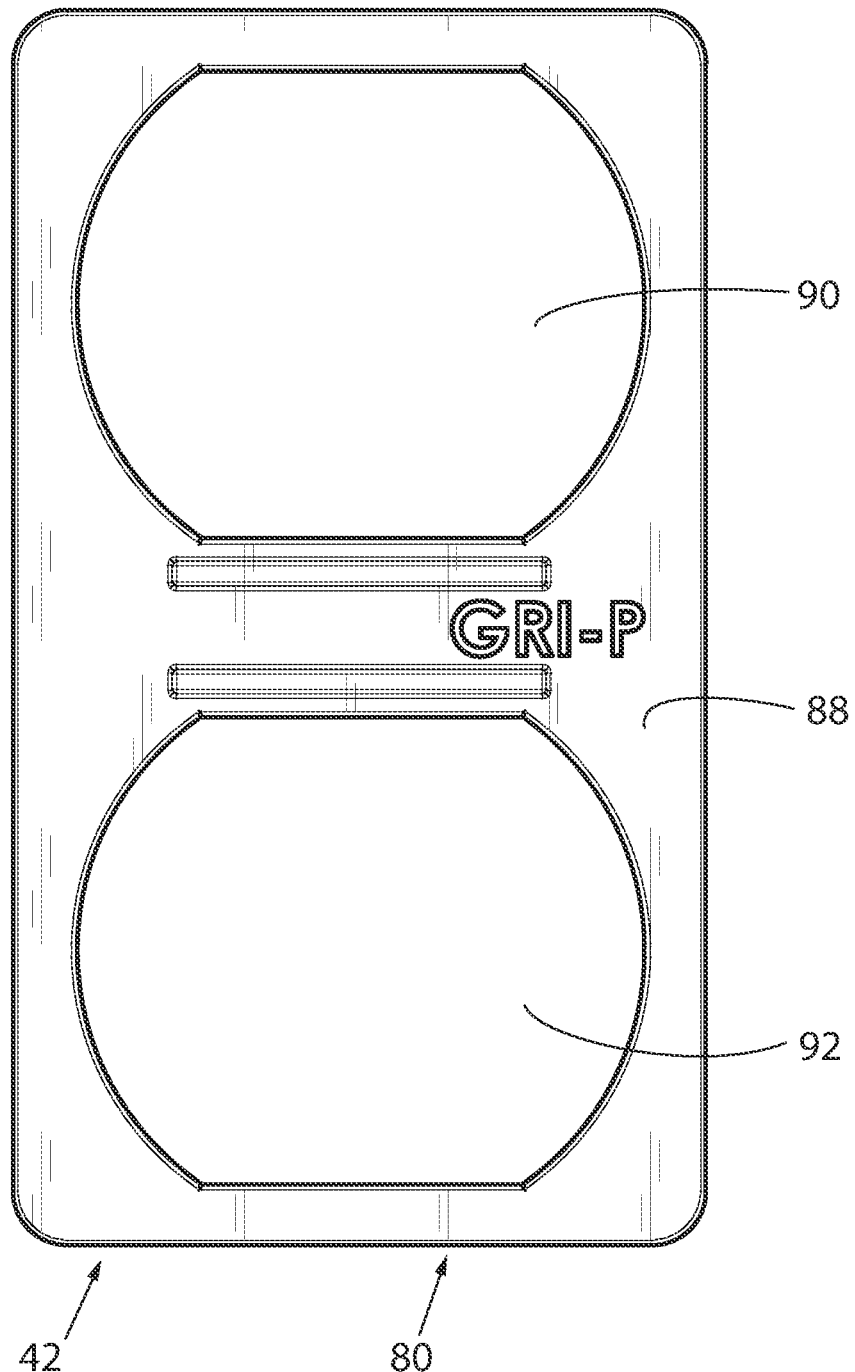
FIG. 13 is a front elevation view of the first adapter of FIG. 12.
Figure 14:
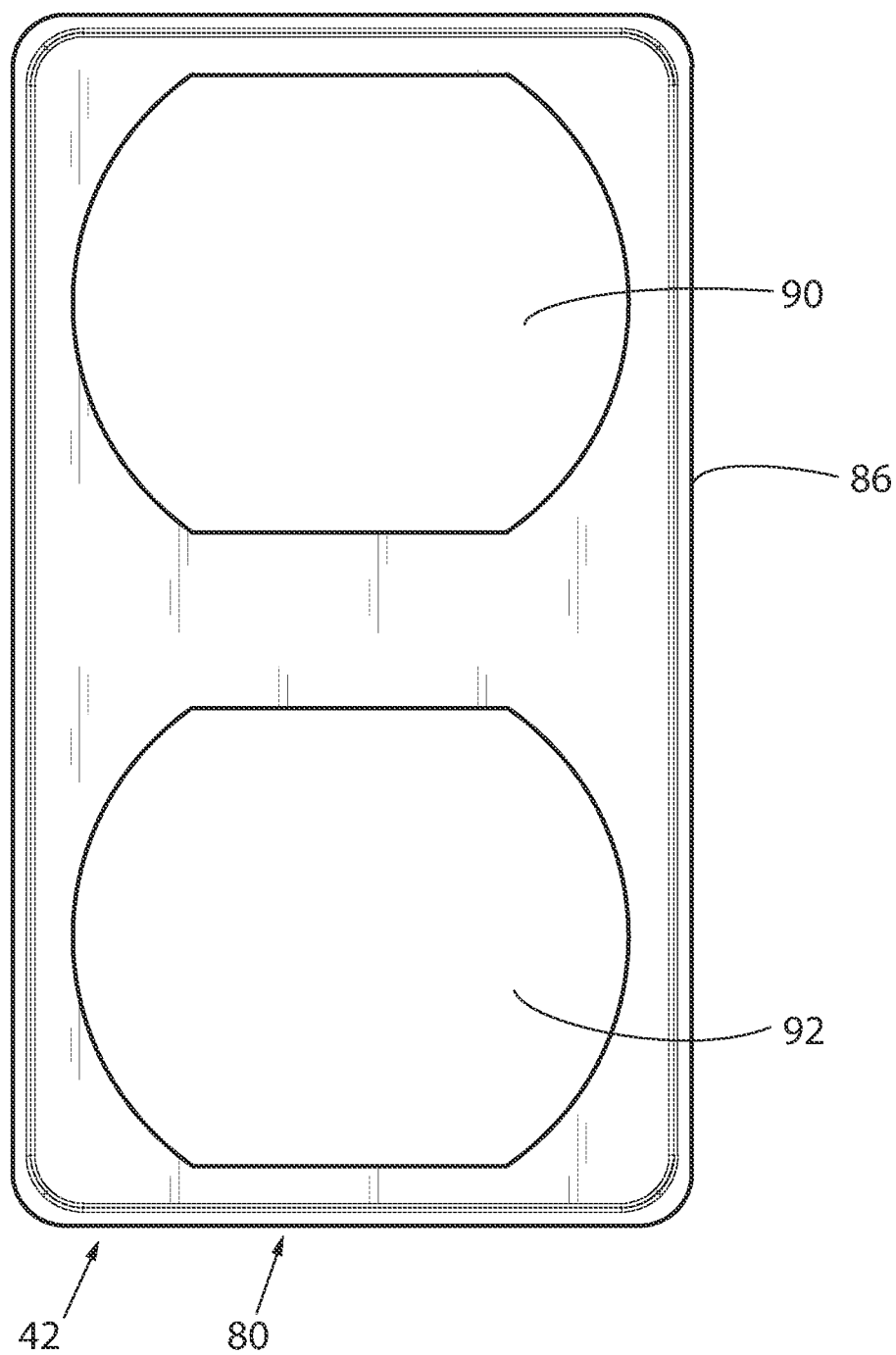
FIG. 14 is a rear elevation view of the first adapter of FIGS. 12 and 13.
Figure 15:
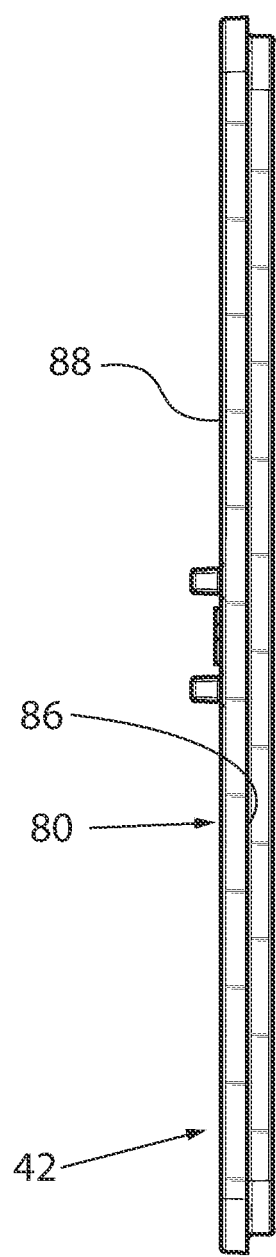
FIG. 15 is a side elevation view of the first adapter of FIGS. 12-14.
Figure 16:
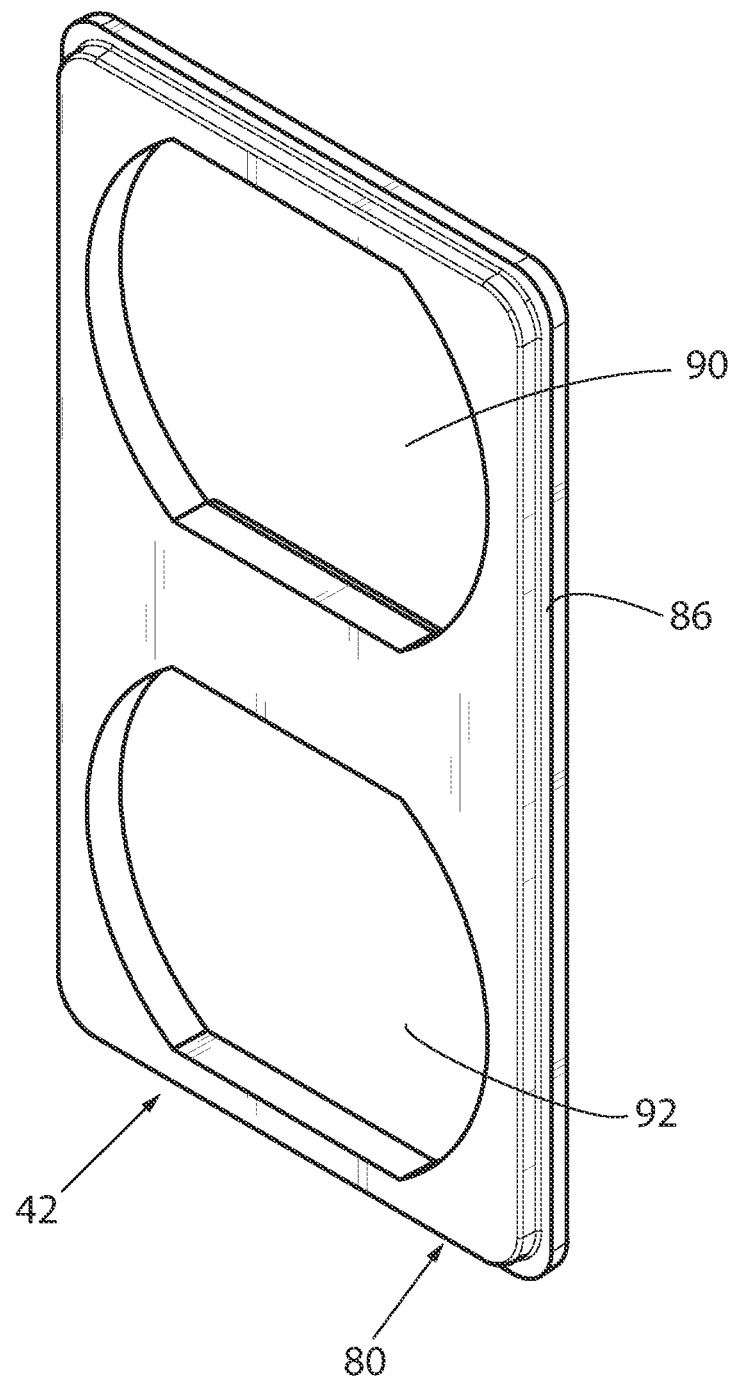
FIG. 16 is a rear isometric perspective view of the first adapter of FIGS. 12-15.
Figure 17:
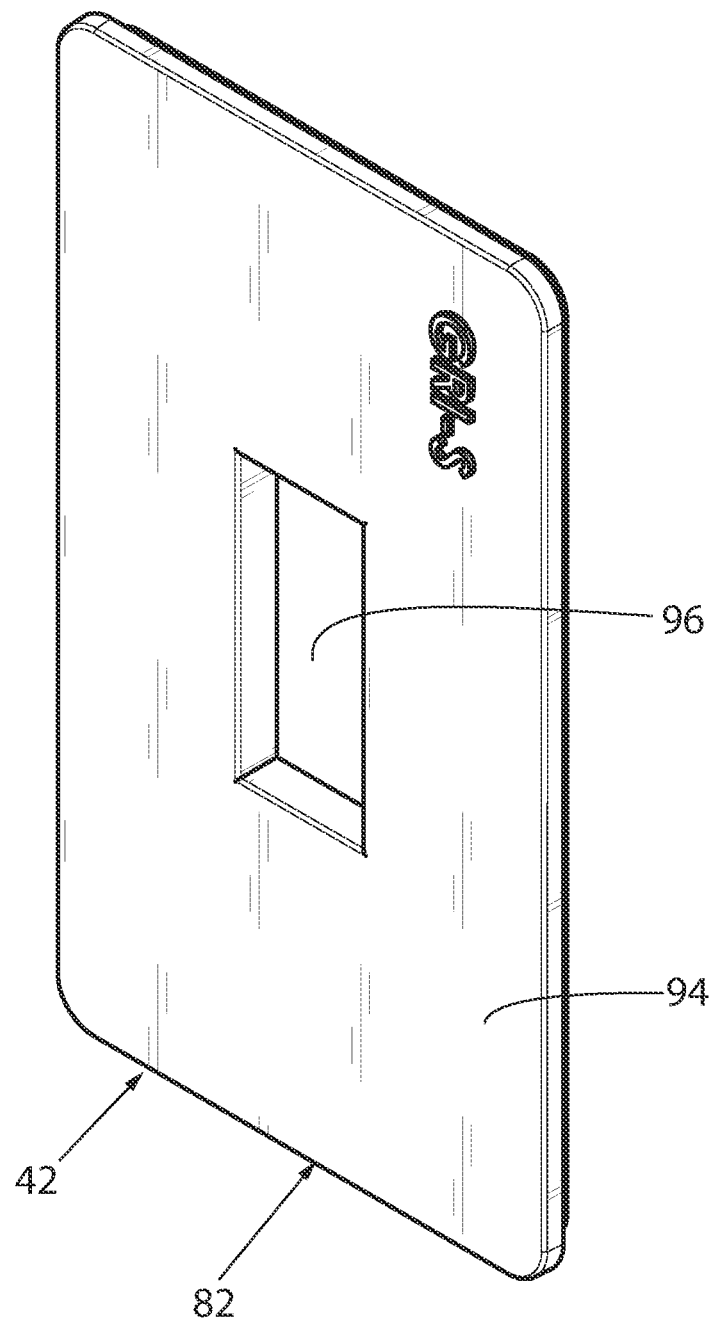
FIG. 17 is an isometric perspective view of a second adapter that is a switch adapter.
Figure 18:
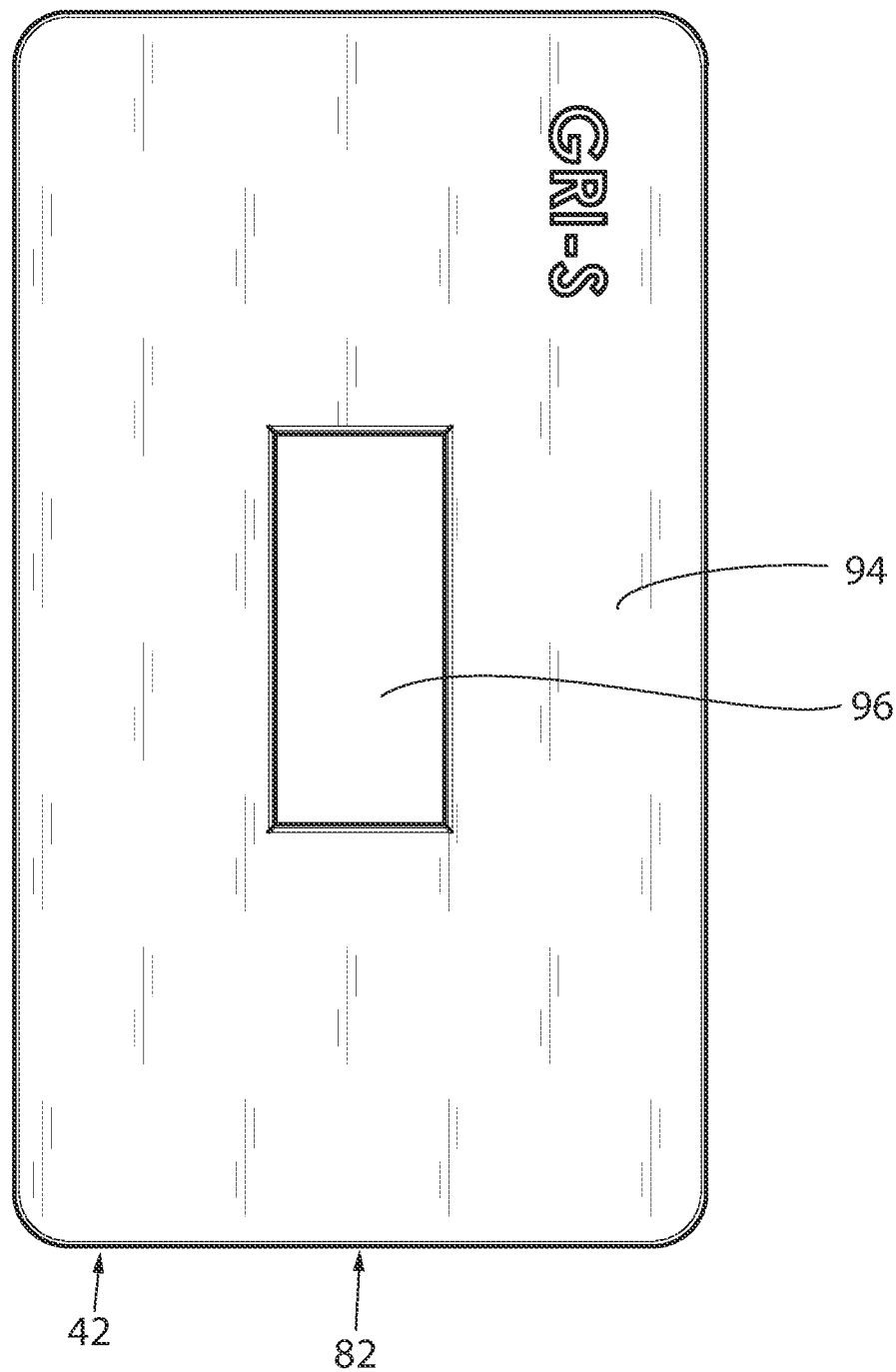
FIG. 18 is a front elevation view of the second adapter of FIG. 17.
Figure 19:
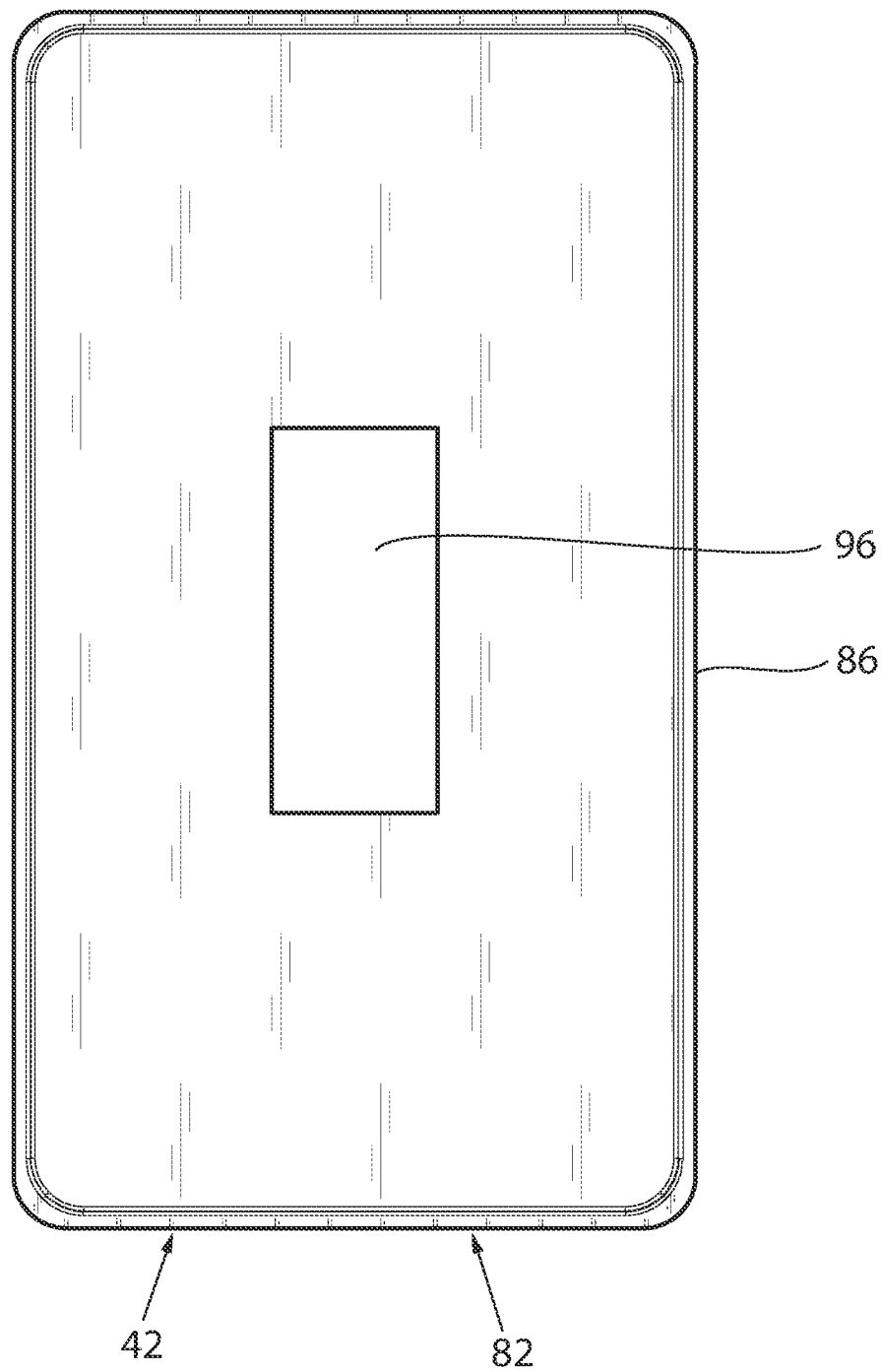
FIG. 19 is a rear elevation view of the second adapter of FIGS. 17 and 18.
Figure 20:
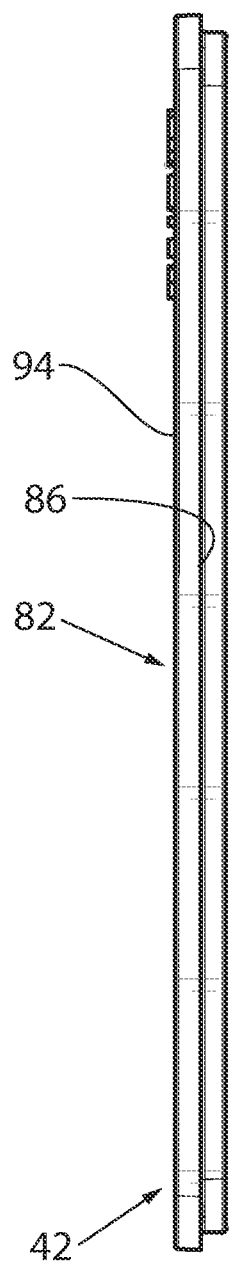
FIG. 20 is a side elevation view of the second adapter of FIGS. 17-19.
Figure 21:
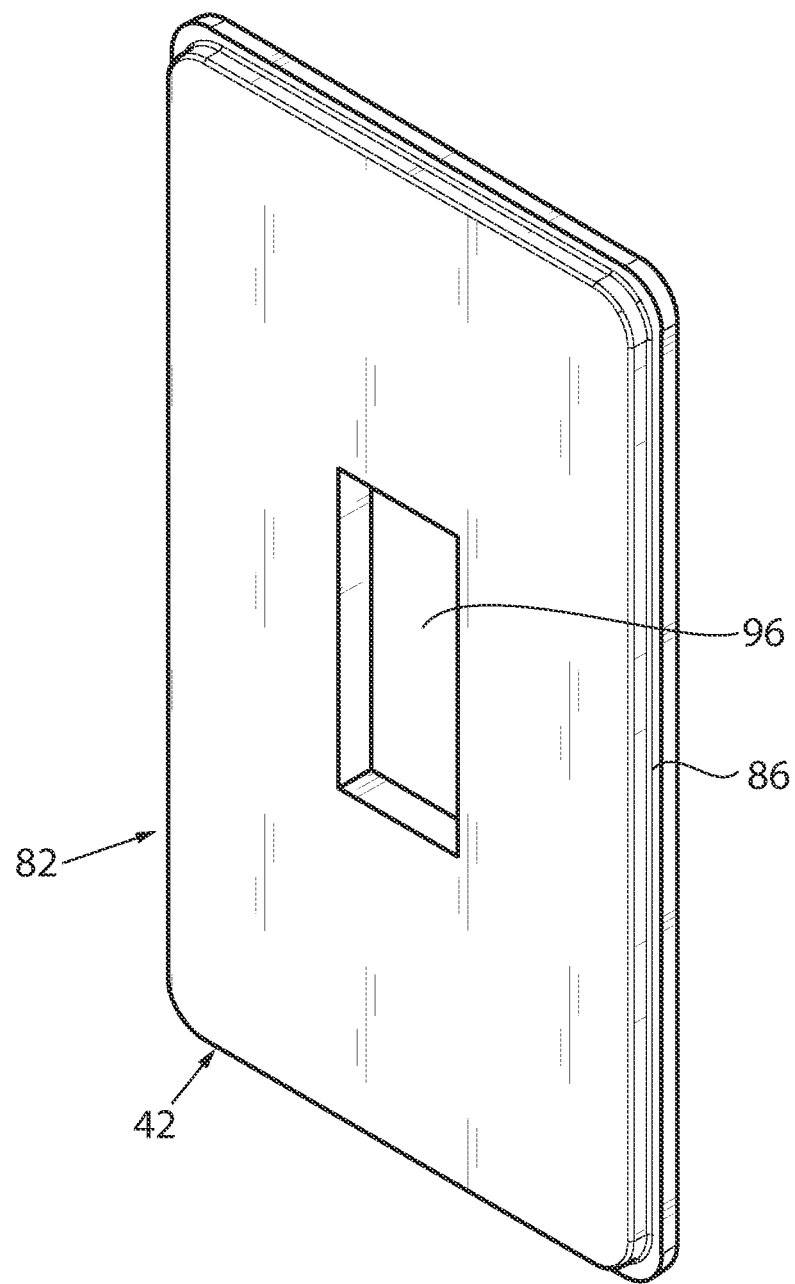
FIG. 21 is a rear isometric perspective view of the second adapter of FIGS. 17-20.
Figure 22:
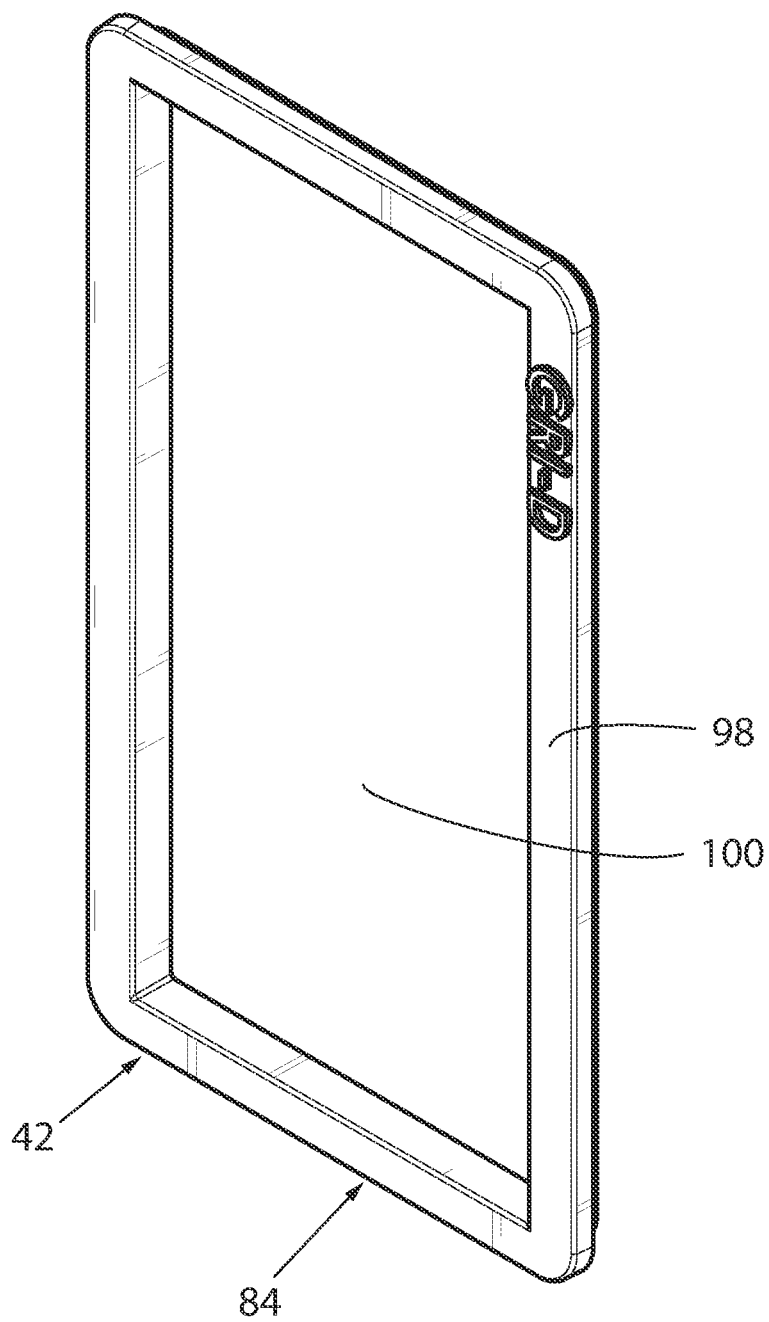
FIG. 22 is an isometric perspective view of a third adapter that is a rocker switch adapter.
Figure 23:
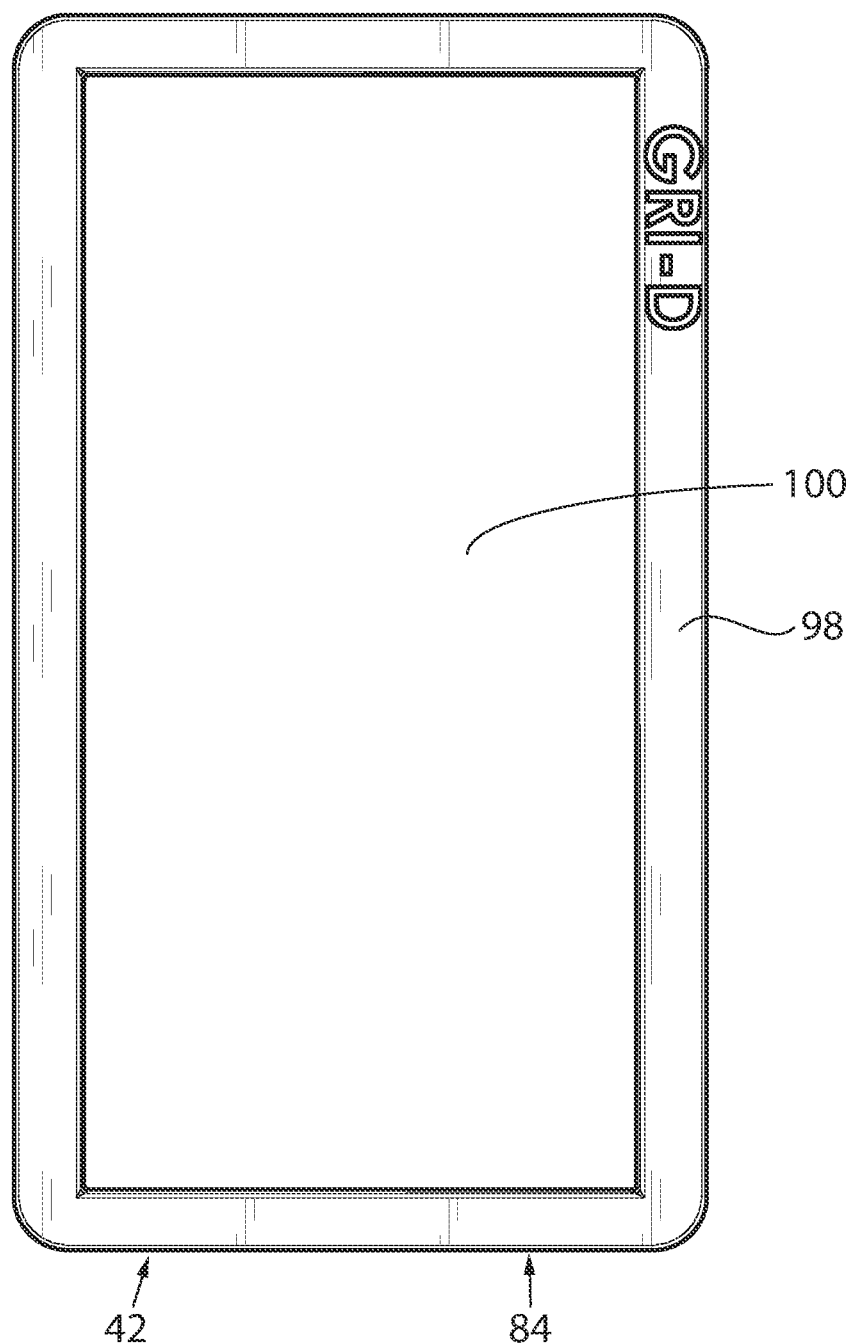
FIG. 23 is a front elevation view of the third adapter of FIG. 22.
Figure 24:
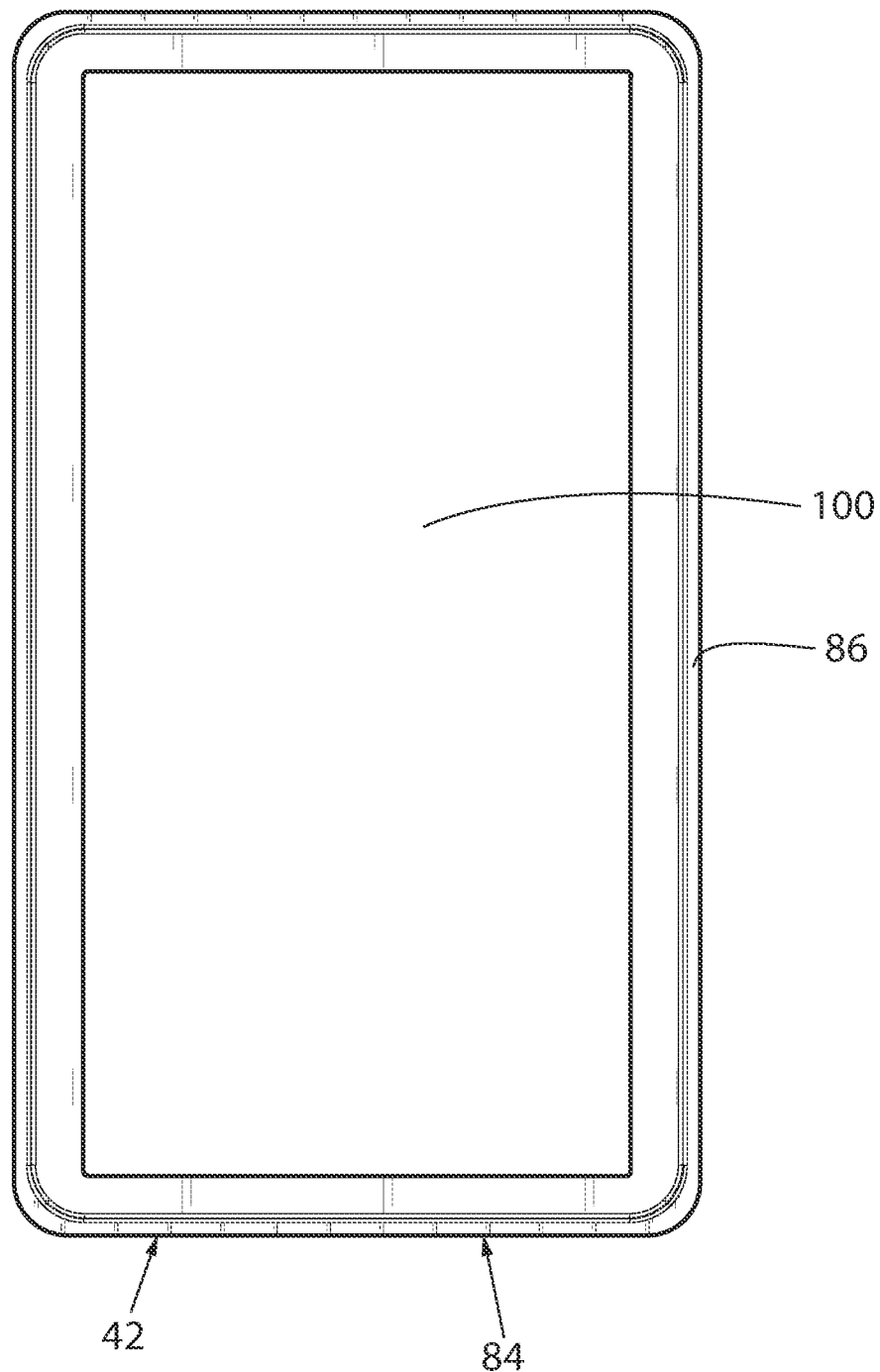
FIG. 24 is a rear elevation view of the third adapter of FIGS. 22 and 23.
Figure 25:
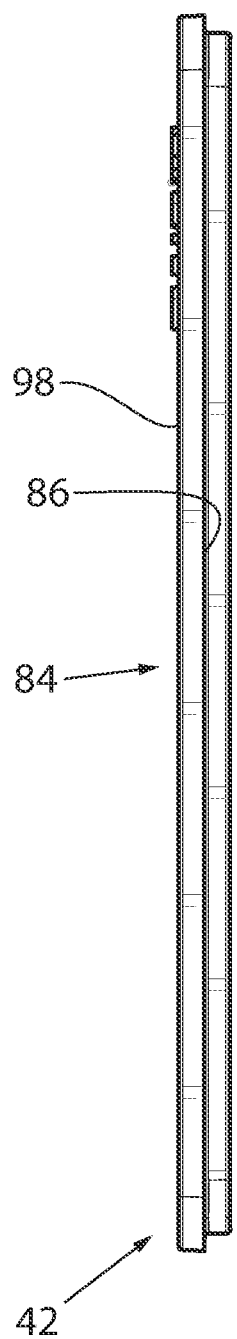
FIG. 25 is a side elevation view of the third adapter of FIGS. 22-24.
Figure 26:
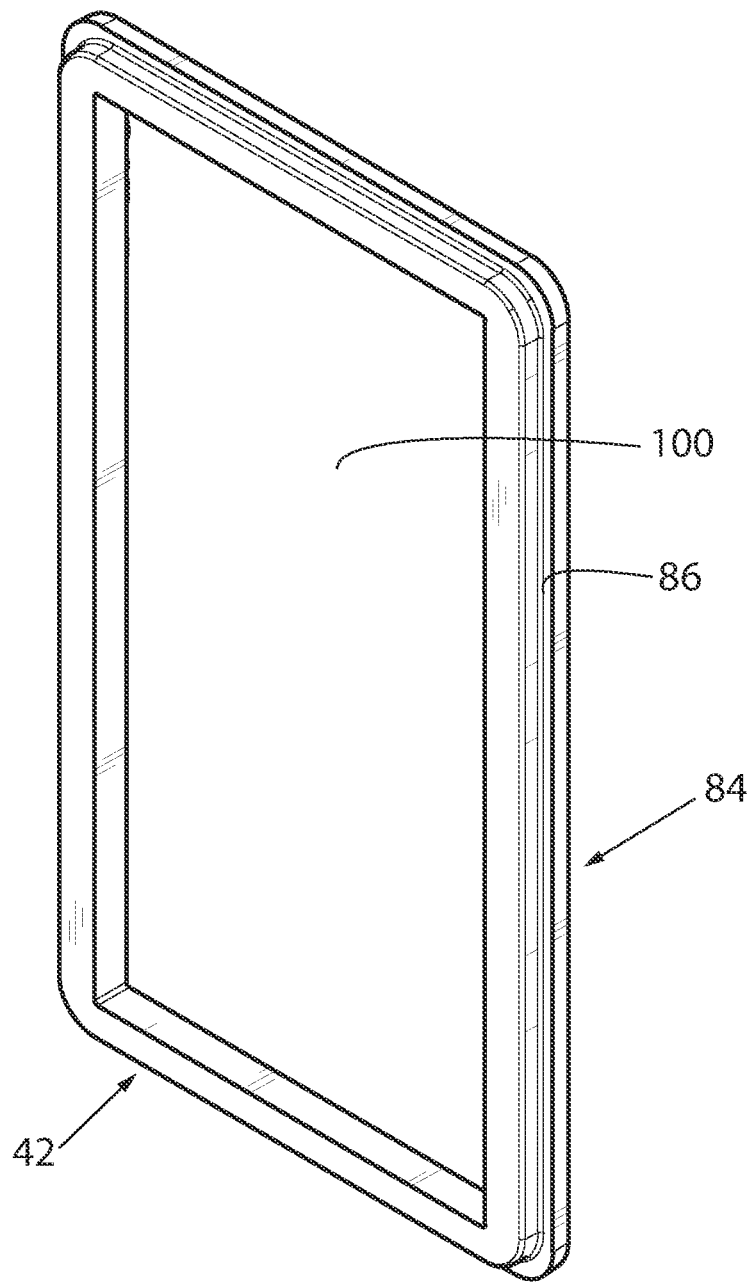
FIG. 26 is a rear isometric perspective view of the third adapter of FIGS. 22-25.
Figure 27:
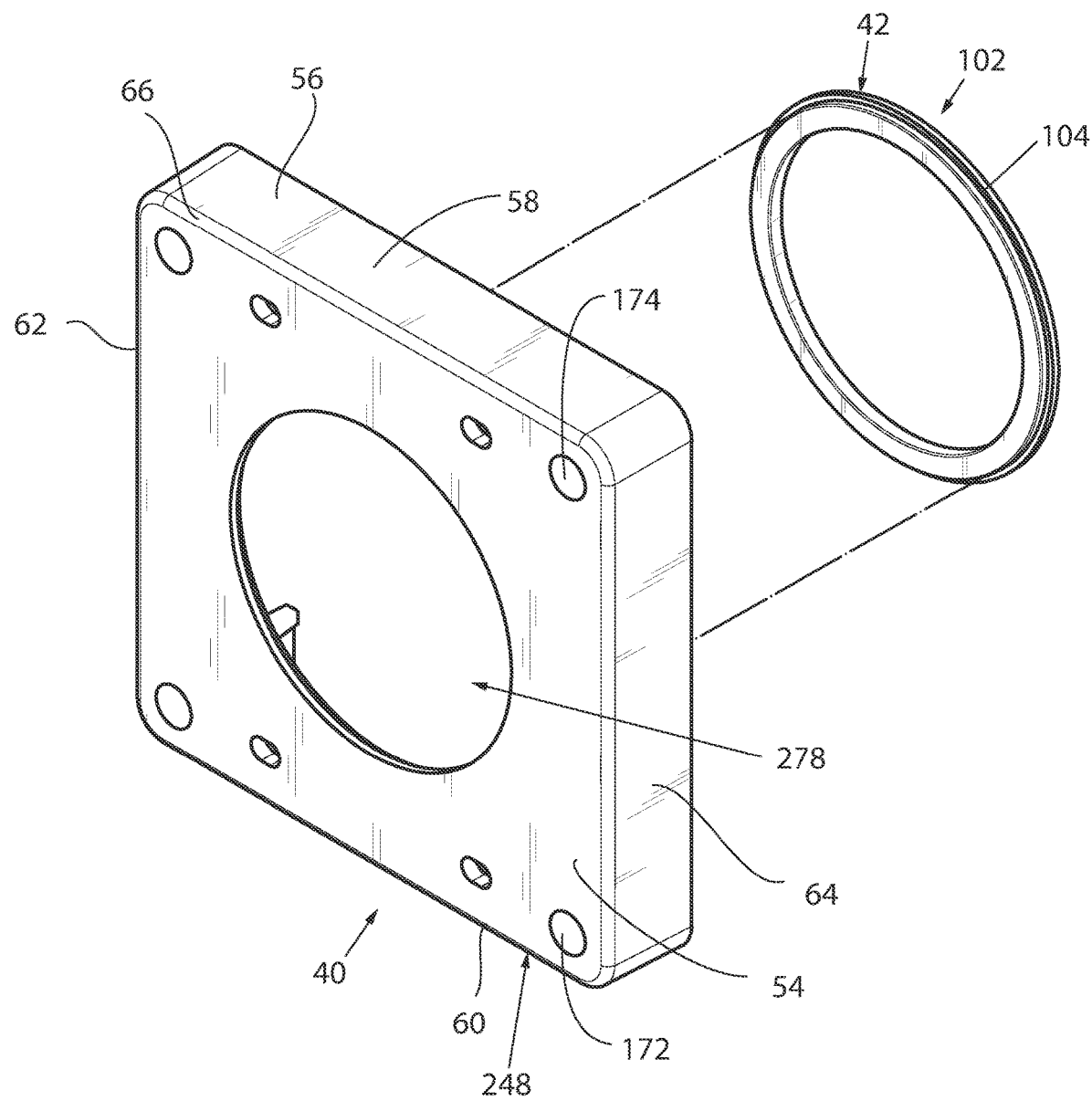
FIG. 27 is an exploded isometric perspective view of another inventive modular electrical box cover plate.
Figure 28:
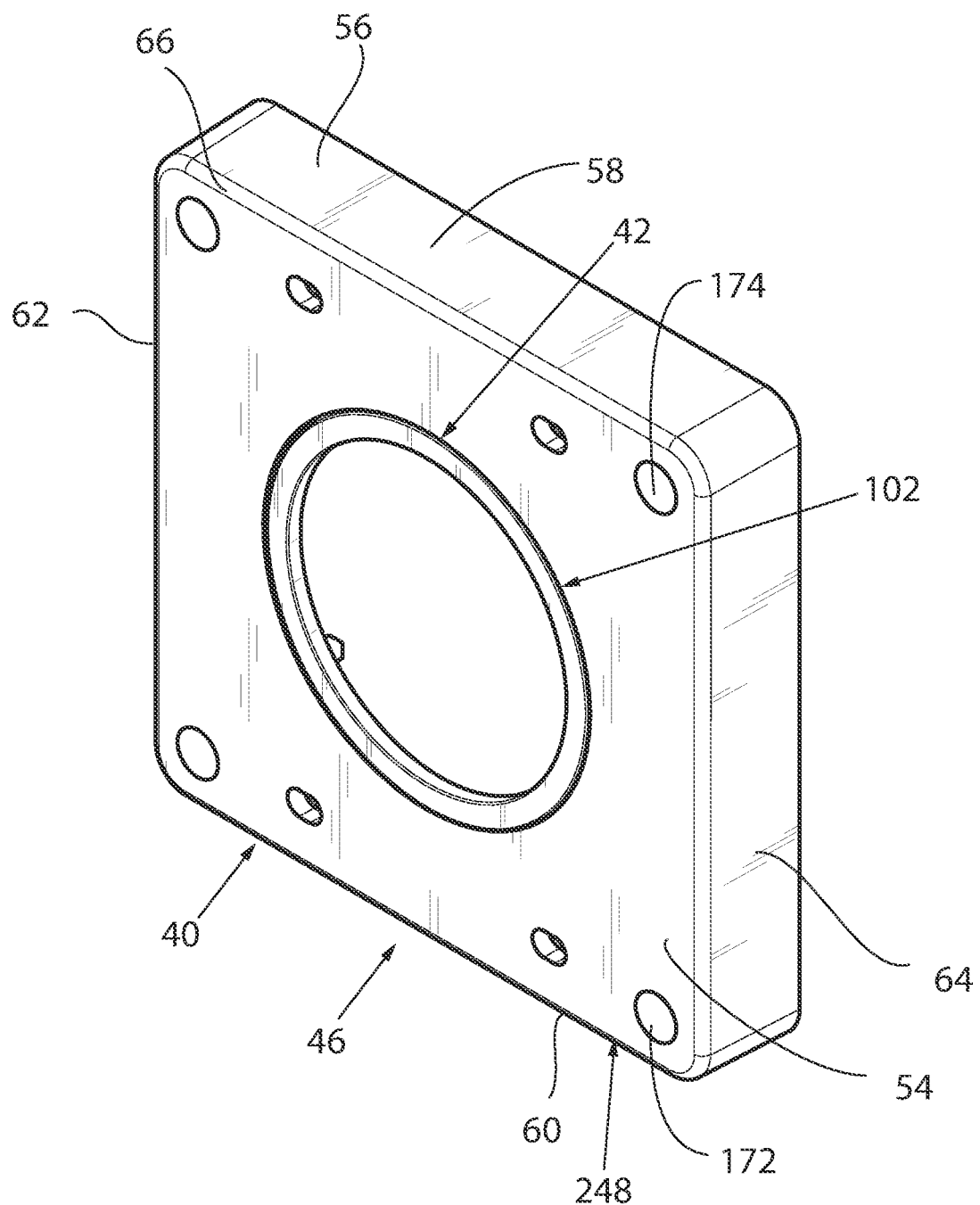
FIG. 28 is an assembled isometric perspective view of the inventive modular electrical box cover plate of FIG. 27.
Figure 29:
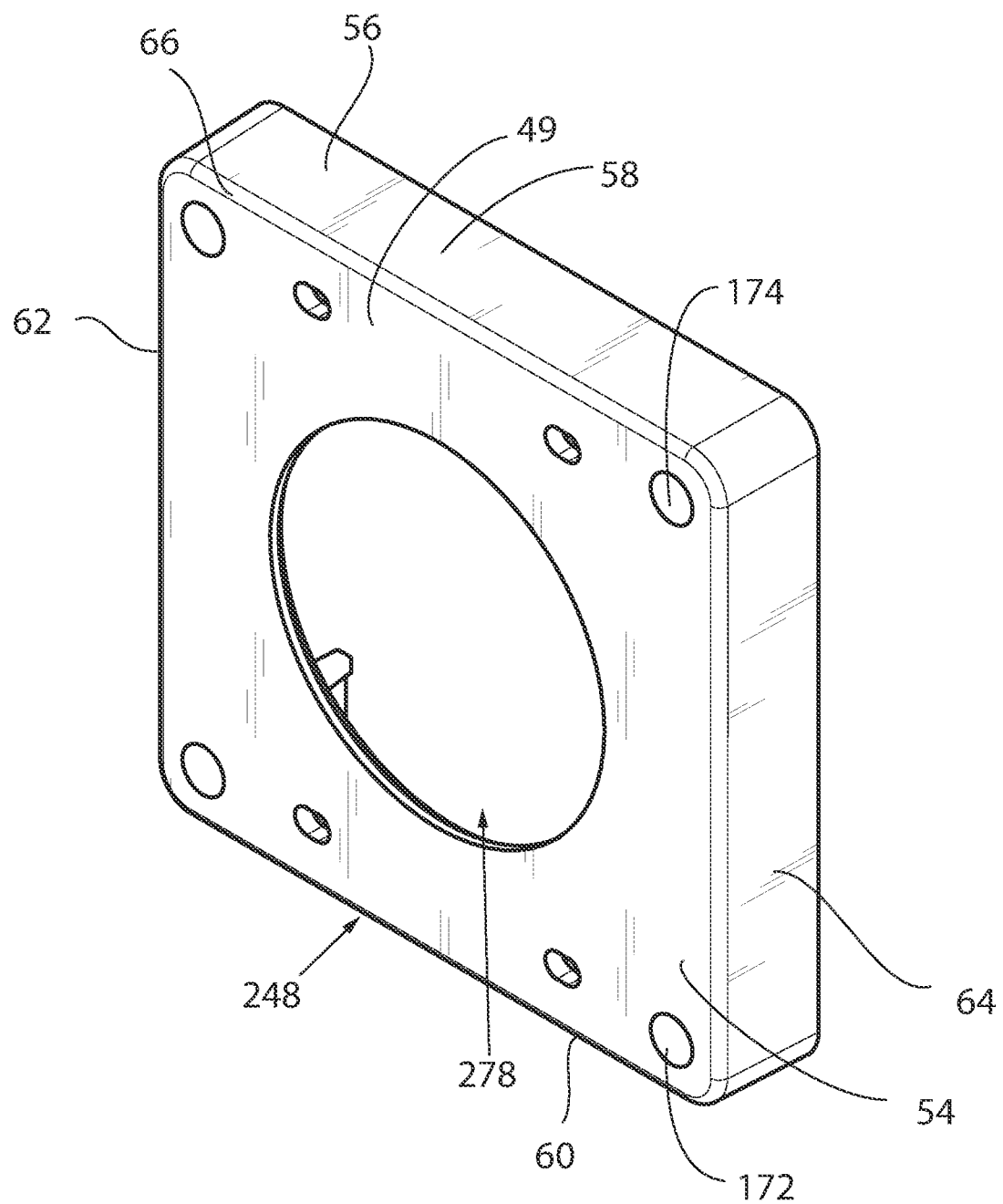
FIG. 29 is an isometric perspective view of the inventive modular electrical box cover plate of FIG. 27.
Figure 30:
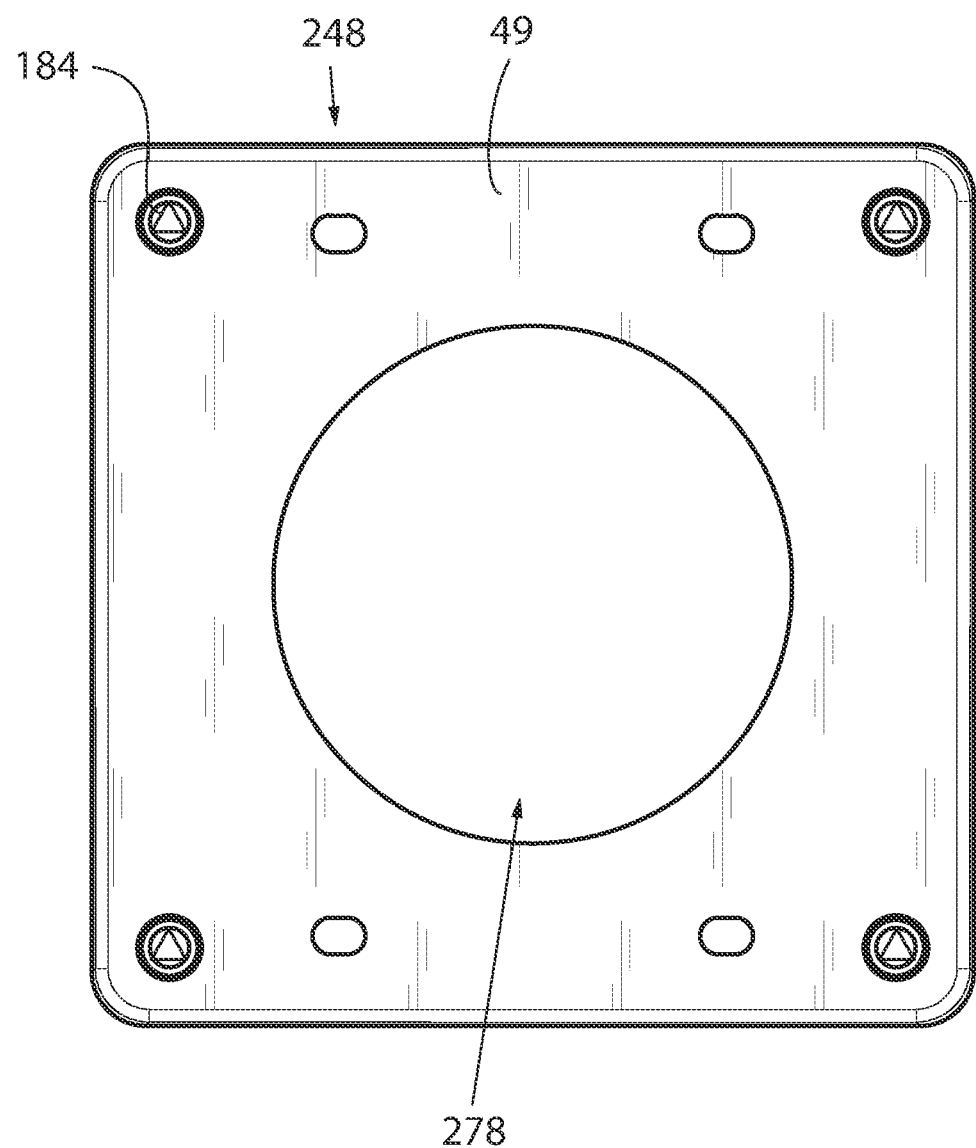
FIG. 30 is a front elevation view of the inventive modular electrical box cover plate of FIG. 29.
Figure 31:
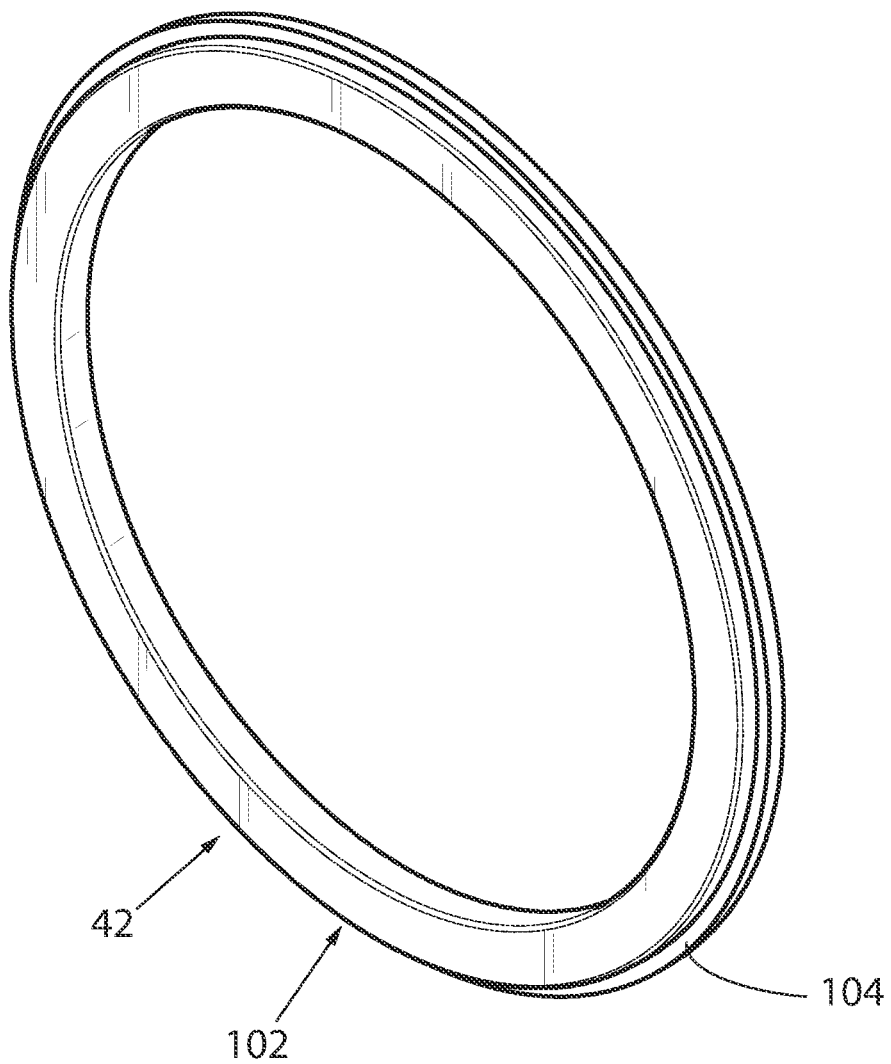
FIG. 31 is an isometric perspective view of an adapter used with the cover plate of FIGS. 29 and 30.
Figure 32:
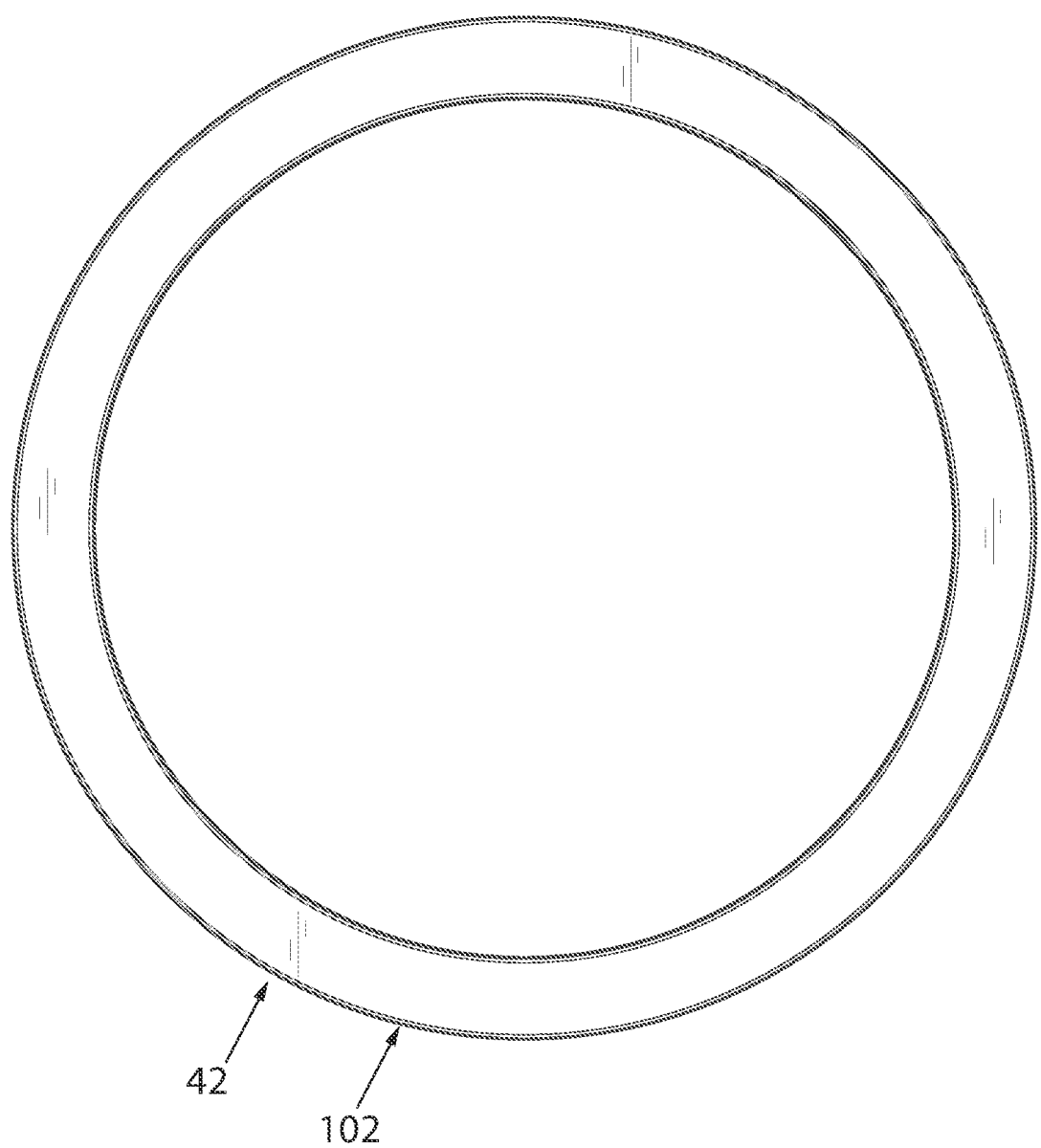
FIG. 32 is a front elevation view of the adapter of FIG. 31.
Figure 33:
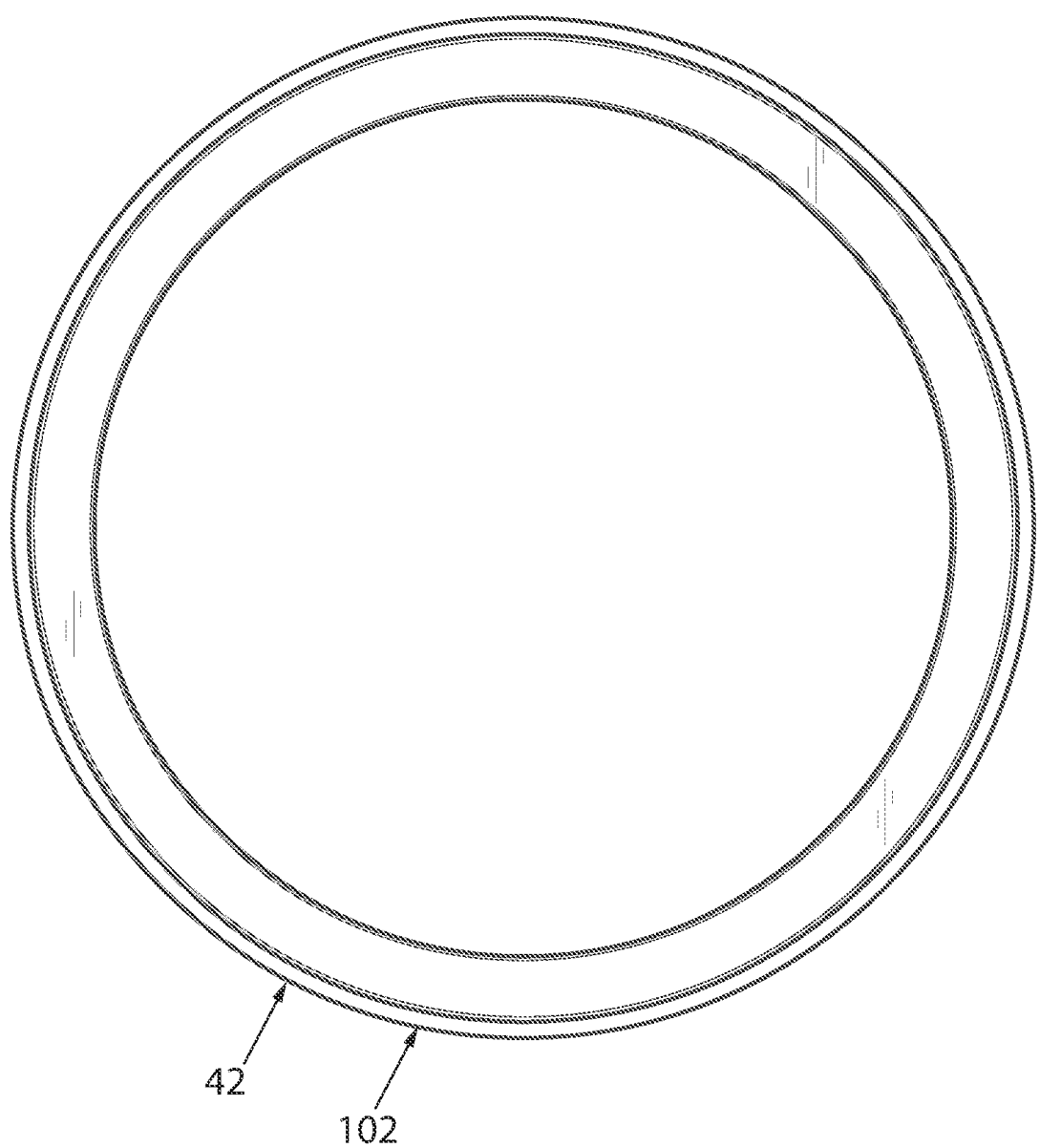
FIG. 33 is a rear elevation view of the adapter of FIGS. 31 and 32.
Figure 34:
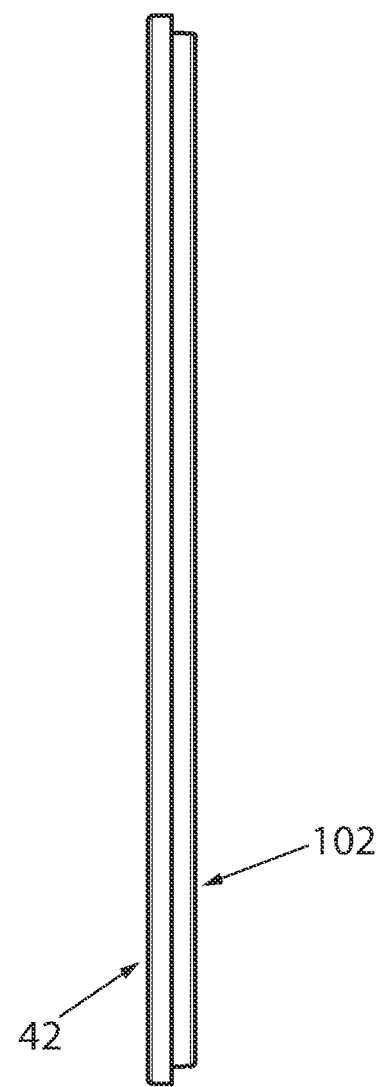
FIG. 34 is a side elevation view of the adapter of FIGS. 31-33.
Figure 35:
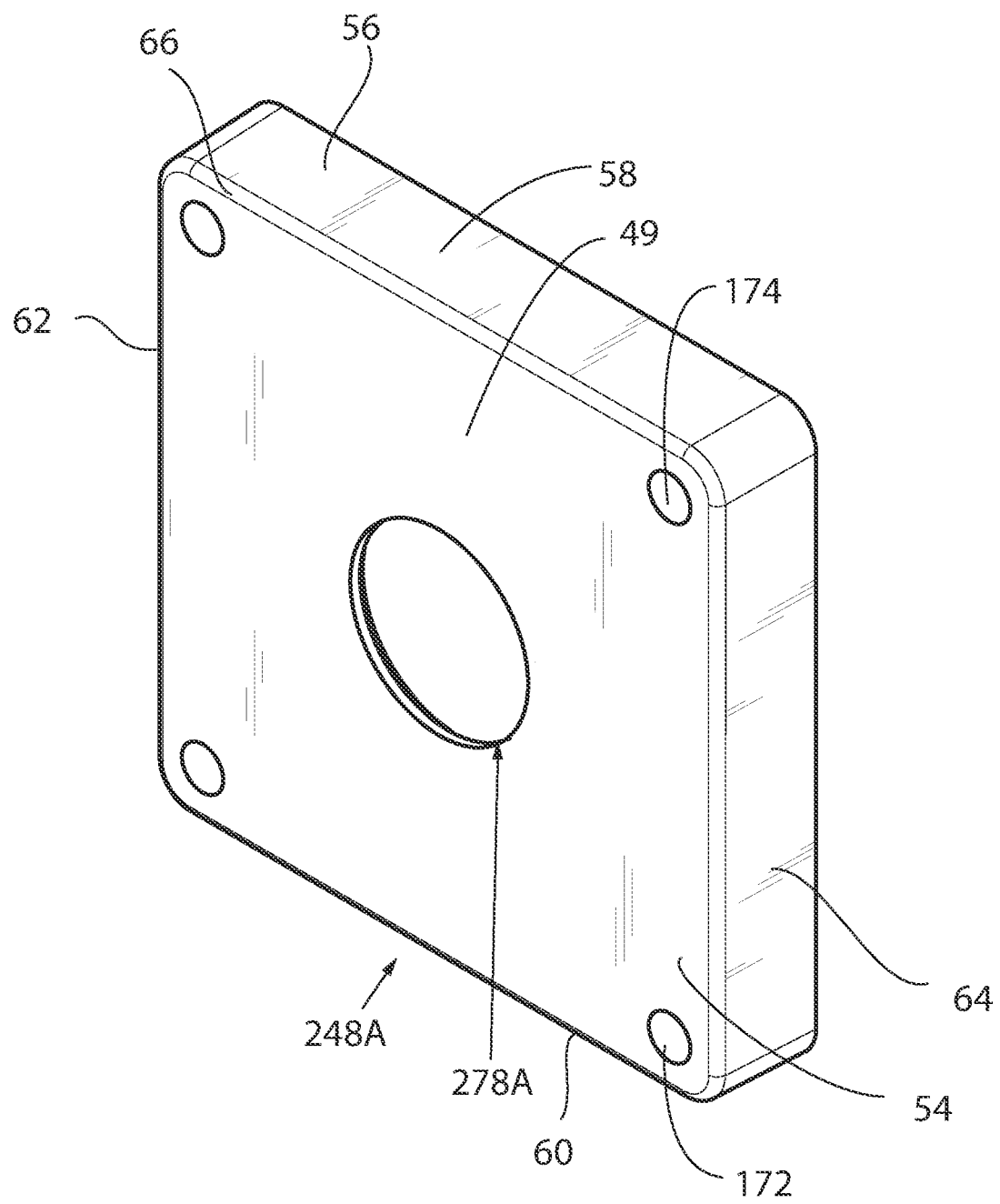
FIG. 35 is an isometric perspective view of an inventive modular electrical box cover plate.
Figure 36:
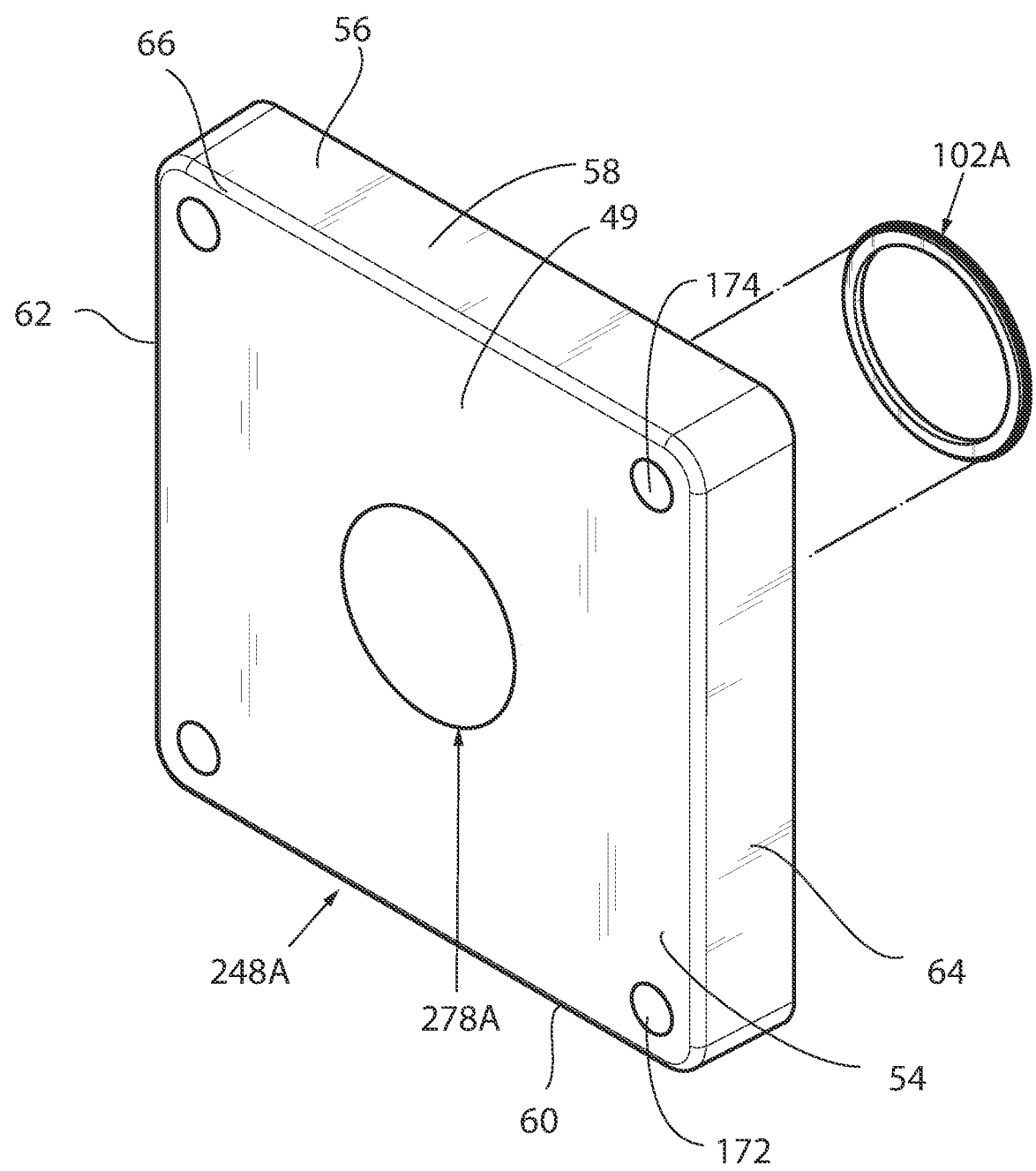
FIG. 36 is an exploded isometric perspective view of the inventive modular electrical box cover plate for FIG. 35 with an adapter.
Figure 37:
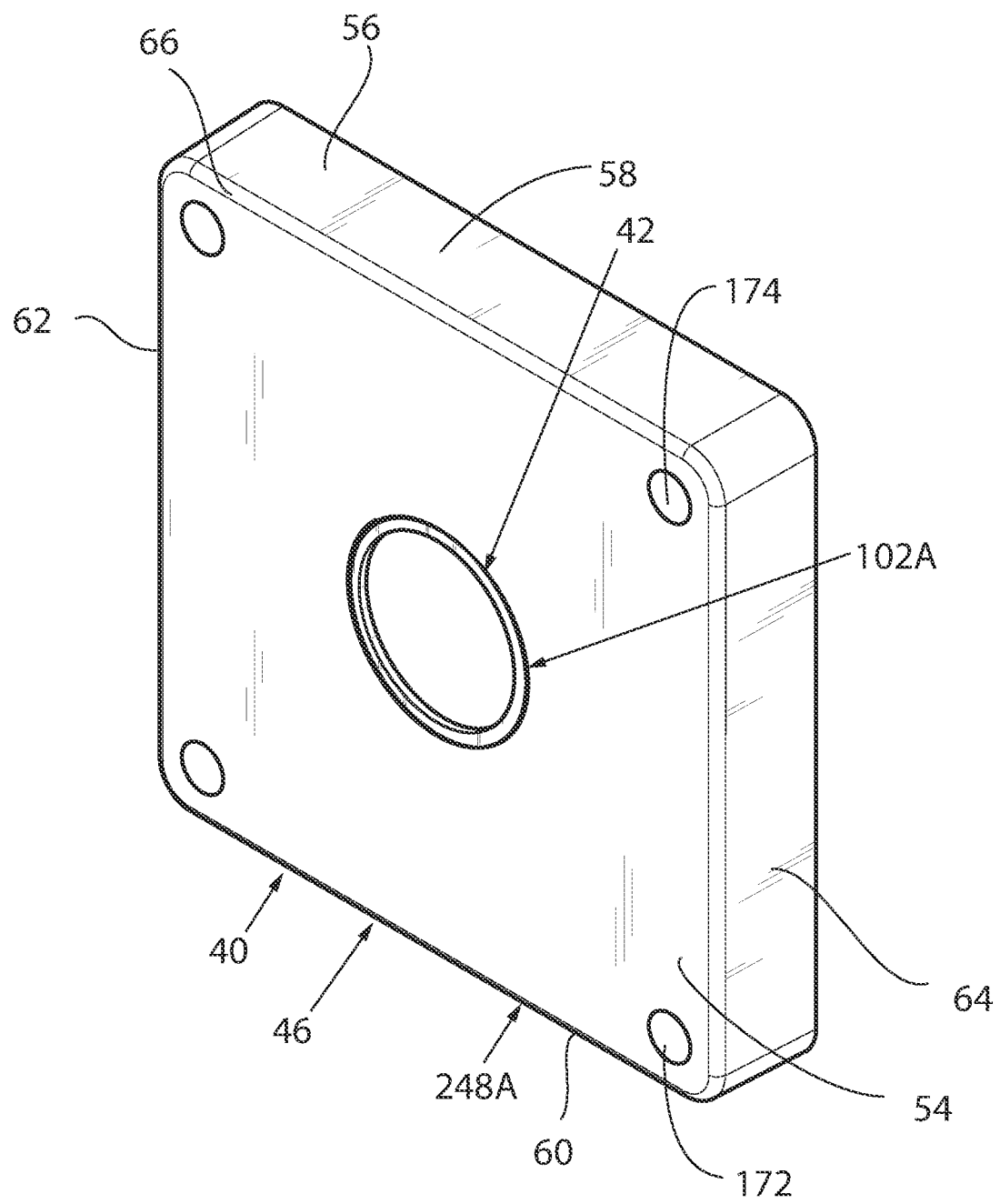
FIG. 37 is an assembled isometric perspective view of the inventive modular electrical box cover plate for FIG. 36.
Figure 38:
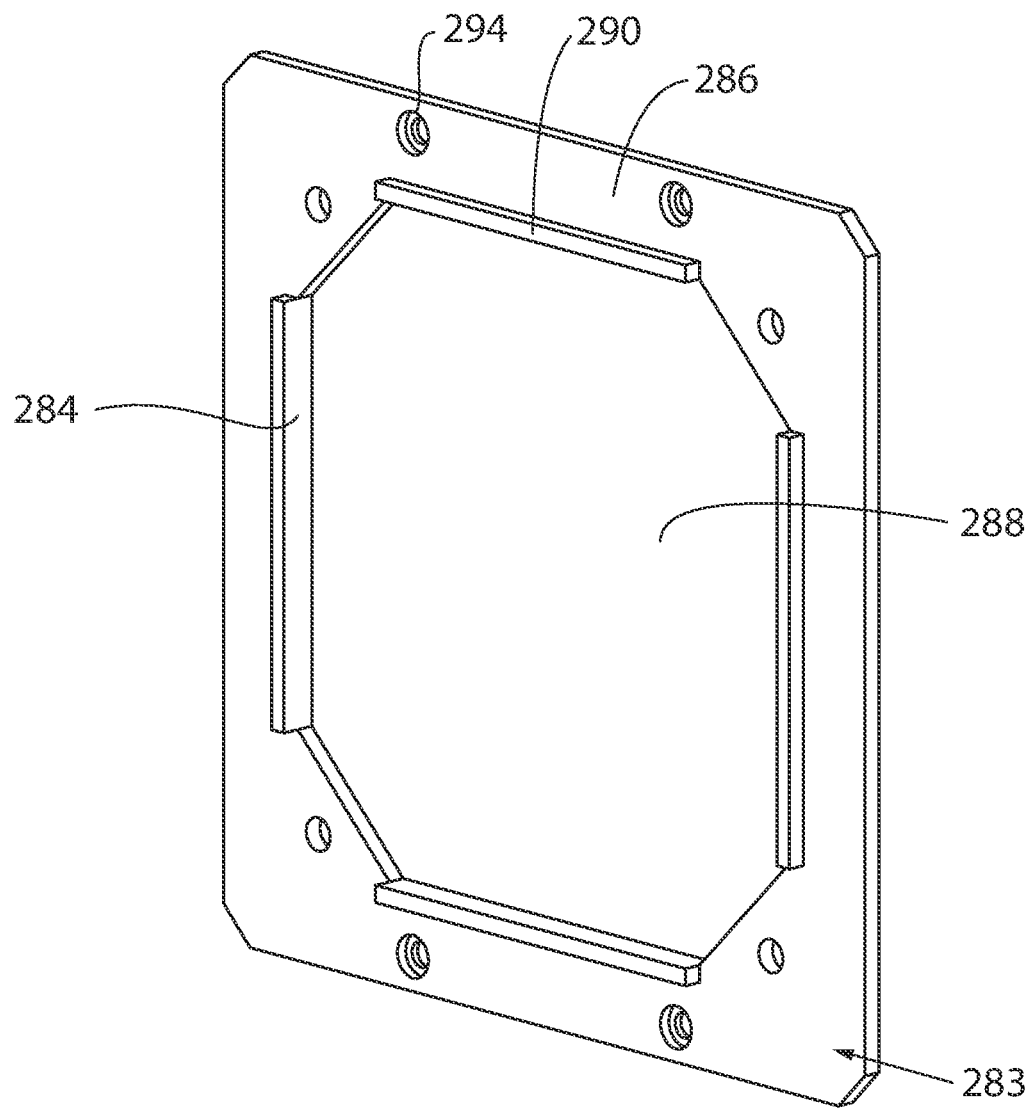
FIG. 38 is an isometric perspective view of an adapter cover.
Figure 39:
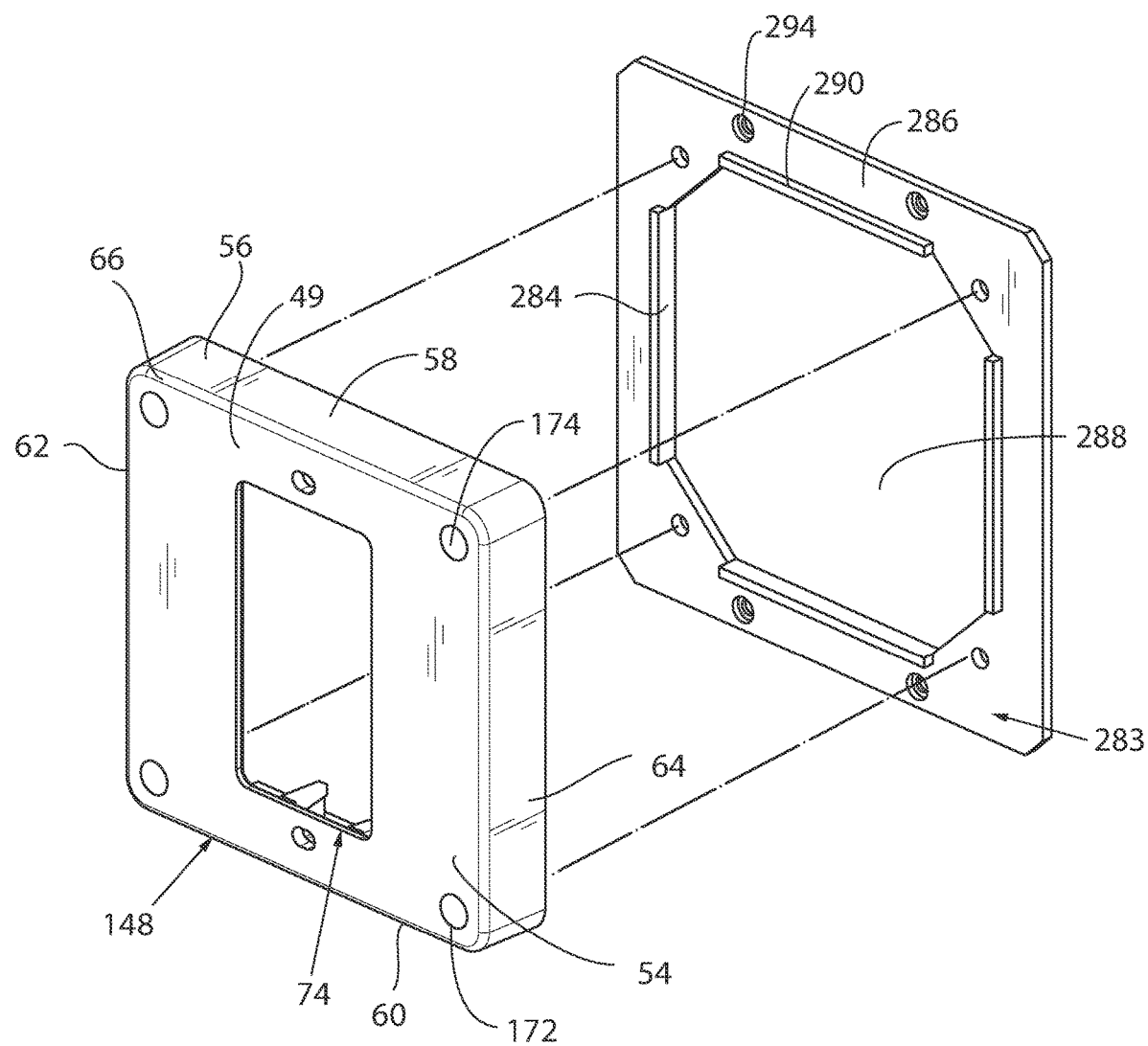
FIG. 39 is an exploded front isometric perspective view of the adapter cover of FIG. 38 in connection with the inventive modular electrical box cover plate.
Figure 40:
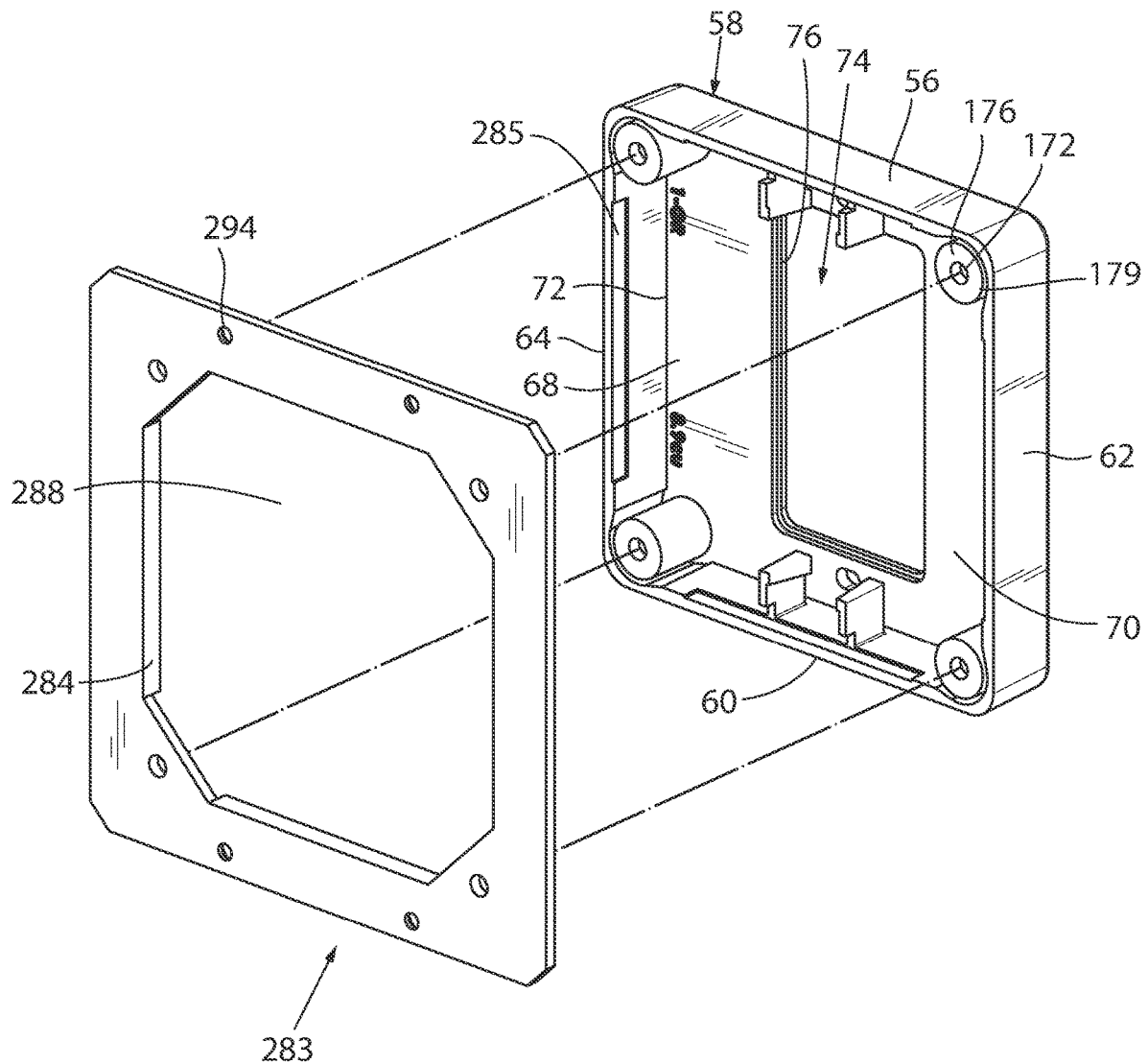
FIG. 40 is an exploded rear isometric perspective view of the adapter cover of FIGS. 38 and 39 in connection with the inventive modular electrical box cover plate.
Figure 41:
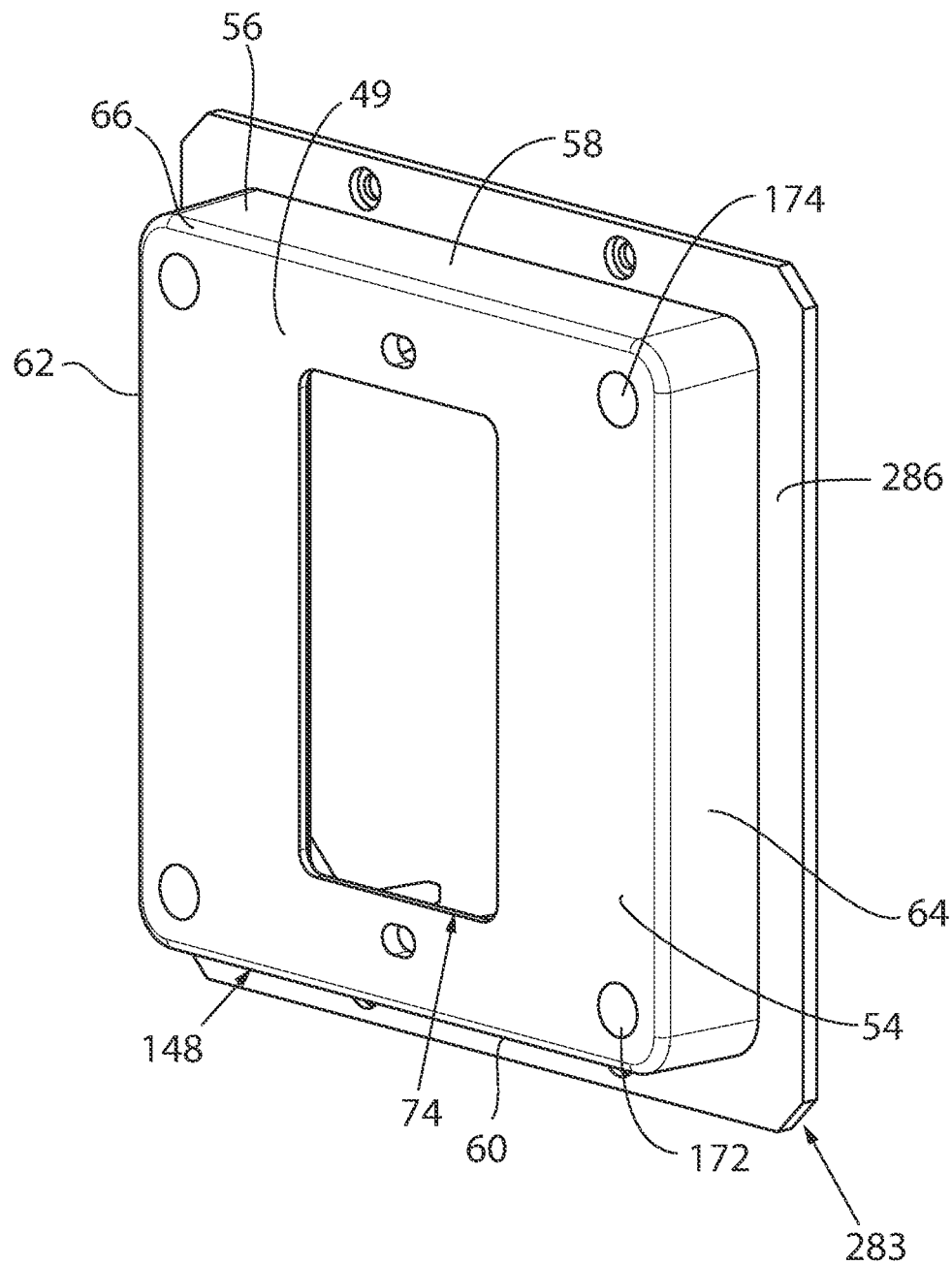
FIG. 41 is an assembled isometric perspective view of the adapter cover and modular electrical box cover plate.

As seen in FIGS. 7 and 11, the cover plate 48 is provided with a locking member 106 for engaging and securing an electrical receptacle 52 within the cover plate 48. The locking member 106 is comprised of top and bottom locking sets 108, 110. Each locking set 108, 110 includes a first panel 112 and a second panel 114. The top locking set 108 is integral with the interior surface 72 of top section 58. Likewise, the bottom locking set 110 is integral with the interior surface 72 of the bottom section 60. Each panel 112, 114 has a proximal edge 116 along which each panel 112, 114 abuts and is joined to the side section 58, 60 to which it is attached.

In another embodiment shown in FIGS. 1, 2, and 5-8, the cover plate 148 is similar to what is described above, but with two electrical circuit devices 44 rather than one. As such a top locking set 108 of cover plate 148 includes a first locking unit 190 and a second locking unit 192. A bottom locking set 110 likewise includes first and second locking units 190, 192. As seen in the figures, the first locking units 190 of both locking sets 108, 110 are in registry wherein a top first panel 156 and a top second panel 158 of the top first locking unit 190 is in alignment opposite from the bottom first panel 160 and the bottom second panel 162 respectively of the bottom first locking unit 190. In the same manner, top panels 156, 158 of the top second locking unit 192 are in registry with bottom panels 160, 162 of the bottom second locking unit 192.

Fastener-channels 172 are positioned at the four corners of the cover plate 48 which are used to mount the cover plate assembly 46 to an electrical outlet box (also called junction box). As seen in FIGS. 6, 7, 10, and 11, each fastener-channel 172 extends through the side wall 56 from a front opening 174 upon the front wall 54 to a rear opening 176 along the rear edge 178 of the side wall 56. The fastener-channels 172 are located upon cover plate 48 so that at least two are in registry with corresponding fastener-apertures upon electrical outlet box 84. Additionally, as seen in FIG., the rear opening 176 may include a gap 179 that is located between the rear opening 176 and each side wall 56. This gap 179 allows the cover plate 48 to more effectively be manufactured without causing the side walls 56 to bend or cave in towards the rear opening 176 when the cover plate 48 is molded.

The cross-sectional diameter of each fastener-channel 172 is dimensioned so that the fastener-channel 172 is sized to receive a fastener 182. Fasteners 182 are guided by the fastener-channels 172 into each respective fastener-aperture for threadably engaging the cover plate assembly 50 to the electrical outlet box. As illustrated in FIGS. 6, 7, 10, and 11, each fastener-channel 172 is provided with flexibly resilient flaps 184 integrally formed within the fastener-channel 172 and located adjacent to the rear opening 176. The flaps 184 are preferably three thin polymeric pieces that are formed at one end of each fastener-channel 172, extending radially inward to define a triangular spacing within fastener-channel 172.

The flaps 184 serve to provide each fastener-channel 172 with one region along the longitudinal length of the fastener-channel 172 that has a narrower cross-sectional diameter than the rest of the fastener-channel 172. The flaps 184 enable the fastener-channel 172 to grip or otherwise hold the fastener 182 therein before the threading of the fastener 182 within the fastener-aperture 180 of the electrical outlet box. This narrowed portion of the barrel of the fastener-channel 172 therefore facilitates easy installation of the cover plate assembly 50 by allowing the installer to quickly insert each fastener 182 by hand into its respective fastener-channel where the fastener 182 is then held in place until the installer is ready to thread or screw each fastener 182 into the electrical outlet box. This is especially beneficial when the cover plate assembly 50 is being installed horizontally onto an overhead junction box such as those located upon ceilings.

The cover plate 48 of the present invention includes at least one opening 74 formed therein. Each of the openings 74 formed in the cover plate that are configured to receive a variety of interchangeable adapters 42 as will further be described below. As shown, each opening 74 include a ridge 76 that extends around the perimeter 78 of the opening 74, which helps to enable proper installation of an adapter 42 relative to an opening 74.

These openings 74 allow the cover plate 48 to be used with any number of different electrical circuit devices 44. More specifically, adapters 42 associated with different electrical circuit devices 44 can quickly and easily be installed relative to the opening or openings 74 formed in the cover plate 48. Advantageously, this allows electricians, as well as hardware stores and bulk sellers, to simply stock the cover plates 48 and adapters 42, such that users can assemble the actual configuration that is needed on the fly while at a job site. Because both the cover plates 48 and adapters 42 are affordably manufactured, this means that sellers no longer need to stock electrical plates that have a predetermined orientation for a specific use, which traditionally would require a large variety of different boxes to be stocked.

The adapters 42 can be mounted within the openings 74 in any number of different ways. For instance, the adapters 42 may be configured to simply rest within the opening or openings 74. Alternatively, the adapters 42 may be snap fit into the opening or openings 74. Any other fastener relationship between the openings 74 and adapters 42 could similarly be employed that ensures that the adapter 42 is held in place relative to the opening 74 during installation of the cover plate 48. Once the completed installation has occurred, all of the components will be secured in place relative to one another.

Looking initially to FIGS. 1, 2, and 5-8, a first embodiment is shown in which the cover plate 48 includes a first opening 274 next to a second opening 276. The first opening 274 and second opening 276 are located side by side relative to one another, and are both of substantially the same rectangular shape and size. As described above, each of the openings 274, 276 may have a ridge 78 extending around the respective opening 274, 276 to help facilitate snug installation of the adapter 42 to the cover plate 48. Such a configuration allows the cover plate 48 to feature two electrical circuit devices 44 that are side by side relative to one another.

As described above, any number of different adapters 42 may be inserted into these openings. By way of example and not limitation, the adapter 42 may be one of an electrical outlet adapter 80, a switch adapter 82, and a rocker switch adapter 84. Each adapter may include a lip 86 that is configured to overlap or otherwise interact with the ridge 76 of the opening 74 to help ensure secure connection.

Turning briefly to the electrical outlet adapter 80 shown in FIGS. 12-16, a front wall 88 is provided with first and second socket-apertures 90, 92 that are double D-shaped and have the specific dimensions that allow them to snugly receive first and second socket-projections when cover plate assembly 50 is fully assembled. Turning briefly to the switch adapter 82 shown in FIGS. 17-21, a front wall 94 is provided that includes a rectangular cut out 96 that is configured to receive a light switch. Turning briefly to the rocker switch adapter 84 shown in FIGS. 22-26, a front wall 98 is provided that includes an extended rectangular cut out 100.

As such, a single cover plate 48 may be provided that can accommodate at least 10 configurations based on the type of adapter 42 being inserted therein, including a variety of combinations of identical or distinct first and second electrical circuit devices 44. As such, potential configurations include side-by-side electrical outlets; side-by-side switches; side-by-side rocker switches; a left side electrical outlet with a right side switch; a right side electrical outlet with a left side switch; a left side electrical outlet with a right side rocker switch; a right side electrical outlet with a left side rocker switch; a left side switch with a right side rocker switch; and a right side switch with a left side rocker switch. Again, this allows an electrician or other individual looking to install various electrical components to arrive at a job site with any number of cover plates 48 and adapters 42, and to quickly and easily assemble the desired configuration by inserting the adapters 42 into the openings 74. Further still, if only one of the two openings 74 are used by inserting an adapter 42 therein, the other opening can be sealed using a punch out 85 which would completely cover the opening 74. In the event that the second opening is needed at a later date, the punch out 85 could simply be removed, after which an adapter 42 could be inserted based on the desired electrical circuit device 44.

In another embodiment shown in FIGS. 3, 4, and 9-11, the cover plate 48 only includes a first opening 74. The first opening 74 is substantially rectangular and of the same size of the first and second openings 274, 276 found in FIGS. 1, 2, and 5-8 Again, a ridge 76 may be provided around the perimeter 78 of the opening 74 to help facilitate assembly. This embodiment allows the cover plate 48 to feature a single electrical circuit device 44 that is centered about the cover plate 48. As mentioned above, any number of different adapters 42 could be used, including an electrical outlet adapter 80, a switch adapter 82, and a rocker switch adapter 84.

Further still, the cover plate 248 or 248A may include openings 278 that are substantially circular in shape. As shown in FIGS. 27-30, 36, and 37, cover plates 48 may be provided having multiple sizes of circular openings 278 depending on the desired electrical circuit device 44. Again, a ridge 76 may extend around the perimeter 78 of the opening 278 to help facilitate installation of a circular adapter 102 relative to the cover plate 48. The installed circular adapter 102 shown in FIGS. 31-35 is configured to accommodate a single circular socket outlet, and includes a lip 104 configured to interact with the ridge 76, as well as a circular opening formed therein that is configured to receive the circular socket outlet.

Also shown in FIG. 38-41 is an adapter cover 283. The adapter cover 283 is provided with four linear rails 284 extending outward from a front surface 286. Each rail 284 extends along one side of the access-opening 288 in the center of the adapter cover 283. The top panels 156, 158 and the bottom panels 160, 162 are recessed forward of the rear edge 178 by a distance slightly greater than the height of rails 284. The rails 284 are positioned upon the adapter cover 283 to allow the adapter cover 283 to be slidably received within cover plate 48 whereby the outside surface 290 of each rail 284 is in direct contact with the interior surface 72 of each section 58, 60, 62, 64 of side wall 56. Additionally, grooves 285 may be formed in each section 58, 60, 62, 64 of side wall 56, where the grooves 285 may received portions of the rails 284. Further still, the rails 284 may further include fingers or other protrusions that extend therefrom that are configured to be inserted into the grooves 285. Alternatively, fasteners may be used to secure the cover plate 48 to the adapter cover 283. The adapter cover 283, with the cover plate assembly 46 attached, is then fastened to an electrical outlet box (not shown) by using additional fasteners that are threaded through expansion-apertures 294 upon adapter cover 283 into fastener-apertures upon the outlet box.

Adapter cover 283 is preferably used to convert a 4 inch cover plate into a 4¹¹⁄₁₆ inch cover plate. In this mariner, an installer is able to easily use the cover plates shown herein with even the larger 4¹¹⁄₁₆ inch junction boxes, eliminating the need to stock separate 4¹¹⁄₁₆ inch cover plates.

Again, U.S. Pat. No. 7,799,992, which is incorporated herein by reference, discloses a double outlet electrical receptacle and switch configuration, as well as a number of other similar configurations, including ways in which these electrical circuit devices are mounted to the respective cover plates. The same types of devices may be mounted to the presented disclosed cover plate 48 and adapter combination of the present invention using the same fasteners and other devices as described in U.S. Pat. No. 7,799,992. Many of the other features described in U.S. Pat. No. 7,799,992 are similarly applicable to the present invention. For the purposes of brevity, further description of these components will not be repeated here.

Finally, the present invention may similarly be directed to a method of assembling and using the various components described above. Similarly, the present invention may be directed to a kit that includes some or all of the components described above, as well as any other components that may be helpful in using this technology, such as fasteners, tools, and the like.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the illustrations provide exemplary grapple and anchor devices, and the individual components need not be formed in the disclosed shapes, or assembled in the disclosed configuration, but could be provided in virtually any shape, and assembled in virtually any configuration. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A modular cover plate assembly for mounting an electrical circuit device to an electrical outlet box comprising:
   a modular cover plate comprising
      (i) a ridge extending inwardly toward an opening and
      (ii) a locking member securing the electrical circuit device to the modular cover plate;
   at least one opening is formed in the modular cover plate;
   an outlet insert adapter insertable into the at least one opening, the outlet insert adapter configured to receive the electrical circuit device, the outlet insert adapter comprises a body and a lip extending from the body, wherein the ridge and the lip overlap to enable receipt of the outlet insert adapter into the at least one opening formed in the modular cover plate when assembled; and
   a second outlet insert adapter, wherein each outlet insert adapter is configured to receive a different electrical circuit device;
   wherein the more than one outlet insert adapter comprises an electrical outlet adapter and a switch adapter.

2. The modular cover plate assembly of claim 1, wherein the outlet insert adapter is secured to the modular cover plate by a friction fit.

3. The modular cover plate assembly of claim 2, further comprising at least one opening formed in the body of the outlet insert adapter.

4. The modular cover plate assembly of claim 3, wherein the at least one opening formed in the body of the outlet insert adapter comprises:
   a first opening that is a first socket-aperture; and
   a second opening that is a second socket-aperture vertically spaced from the first opening;
   wherein the outlet insert adapter is an electrical outlet adapter.

5. The modular cover plate assembly of claim 3, wherein the at least one opening formed in the body of the outlet insert adapter comprises a single substantially rectangular opening configured to receive a switch;
   wherein the outlet insert adapter is a switch adapter.

6. The modular cover plate assembly of claim 3, wherein the at least one opening formed in the body of the outlet insert adapter comprises a single substantially rectangular opening configured to receive a rocker switch;
   wherein the outlet insert adapter is a rocker switch adapter.

7. The modular cover plate assembly of claim 1, wherein the outlet insert adapter is secured to the modular cover plate by a snap fit.

8. The modular cover plate assembly of claim 1, wherein the at least one opening further comprises a first substantially rectangular opening configured to receive one outlet insert adapter.

9. The modular cover plate assembly of claim 1, wherein the at least one opening further comprises:
   a first substantially rectangular opening configured to receive a first outlet insert adapter; and
   a second substantially rectangular opening configured to receive a second outlet insert adapter.

10. The modular cover plate assembly of claim 1, wherein the at least one opening further comprises a substantially circular opening.

11. The modular cover plate assembly of claim 1, further comprising at least two corner fastener channels configured to hold a fastener when the modular cover plate assembly is installed.

12. The modular cover plate assembly of claim 11, wherein the at least two corner fastener channels are each spaced from sidewalls of the modular cover plate by a gap.

13. A modular cover plate assembly for mounting an electrical circuit device to an electrical outlet box comprising:
   a cover plate having a body with a front surface, a rear surface, and at least one opening extending from the front surface to the rear surface, the cover plate comprising a ridge extending inwardly towards the at least one opening around the entire perimeter of the at least one opening;
   at least one interchangeable insert positioned within the at least one opening, the at least one interchangeable insert sized and shaped to accommodate standard common electrical circuit devices, the interchangeable insert comprising a body and a lip extending from the body; and
   at least one electrical circuit device mounted to the cover plate and the at least one interchangeable insert,
   wherein the lip and the ridge overlap when the cover plate, the at least one interchangeable insert, and the at least one electrical circuit device are assembled; and
   a second interchangeable insert, wherein each interchangeable insert is configured to receive a different electrical circuit device;
   wherein the interchangeable inserts comprise an electrical outlet adapter and a switch adapter.

14. The modular cover plate assembly of claim 13, wherein the at least one interchangeable insert has a front surface;
   wherein the at least one electrical circuit device has a front surface; and
   wherein the cover plate front surface, the at least one interchangeable insert front surface, and the at least one electrical circuit device front surface are coplanar when the cover plate, the at least one interchangeable insert, and the at least one electrical circuit device are assembled.

15. The modular cover plate assembly of claim 13, wherein the at least one interchangeable insert is selected from the group consisting of an electrical outlet adapter having first and second socket-apertures, a switch adapter having a single rectangular aperture, and a rocker switch adapter having a single rectangular aperture.

16. A method of assembling a modular cover plate assembly, comprising the steps of:
   selecting a cover plate having at least one opening formed therein, the cover plate comprising a locking member;
   selecting at least one adapter from a plurality of adapters configured for common electrical circuit devices;
   inserting the at least one adapter into the at least one opening;
   securing at least one electrical circuit device to the cover plate with the locking member;
   overlapping a lip extending from a body of the at least one adapter with a ridge extending inwardly from the cover plate towards the opening; and
   holding the at least one adapter in the opening by one or more of a friction fit and a snap fit; and
   selecting a second adapter con I to receive a different electrical circuit device;
   wherein the at least one adapter and second adapter each comprise an electrical outlet adapter and a switch adapter.

17. The method of claim 16, further comprising the step of providing a kit containing:
   at least one cover plate;
   a plurality of adapters;
   at least one electrical circuit devices, and
   a plurality of fasteners.

18. The modular cover plate assembly of claim 17, wherein the more than one outlet insert adapter further comprises a rocker switch adapter.

19. A modular cover plate assembly for mounting an electrical circuit device to an electrical outlet box comprising:
   a modular cover plate comprising
      (i) a ridge extending inwardly toward an opening and
      (ii) a locking member securing the electrical circuit device to the modular cover plate;
   at least one opening is formed in the modular cover plate; and
   an outlet insert adapter insertable into the at least one opening, the outlet insert adapter configured to receive the electrical circuit device, the outlet insert adapter comprises a body and a lip extending from the body, wherein the ridge and the lip overlap to enable receipt of the outlet insert adapter into the at least one opening formed in the modular cover plate when assembled;
   wherein the outlet insert adapter further comprises a rocker switch adapter.

20. A modular electrical cover plate system comprising:
   a cover plate defining at least one aperture sized to receive an insert adapter;
   a set of interchangeable outlet insert adapters removably engageable with the at least one aperture, each outlet insert adapter configured to receive a different type of electrical circuit device;
   the set of interchangeable outlet insert adapters comprising:
      (i) an electrical outlet adapter configured to receive an electrical receptacle,
      (ii) a switch adapter configured to receive a toggle switch, and
      (iii) a rocker switch adapter configured to receive a rocker switch; and
   wherein the cover plate and the set of interchangeable outlet insert adapters are configured such that any one of the outlet insert adapters may be selectively secured within the aperture to accommodate a corresponding electrical circuit device.

* * * * *